(12) United States Patent
Peinado et al.

(10) Patent No.: US 7,565,509 B2
(45) Date of Patent: Jul. 21, 2009

(54) USING LIMITS ON ADDRESS TRANSLATION TO CONTROL ACCESS TO AN ADDRESSABLE ENTITY

(75) Inventors: Marcus Peinado, Bellevue, WA (US); Paul England, Bellevue, WA (US); Bryan Mark Willman, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 604 days.

(21) Appl. No.: 10/286,613

(22) Filed: Nov. 1, 2002

(65) Prior Publication Data

US 2003/0200412 A1    Oct. 23, 2003

Related U.S. Application Data

(63) Continuation-in-part of application No. 10/124,609, filed on Apr. 17, 2002, now Pat. No. 6,986,006.

(51) Int. Cl.
*G06F 12/00* (2006.01)
(52) U.S. Cl. .................. 711/202; 711/163; 711/151; 711/152
(58) Field of Classification Search .................. None
See application file for complete search history.

(56) References Cited

U.S. PATENT DOCUMENTS 5,481,689 A * 1/1996 Stamm et al. ............... 711/202
5,590,326 A * 12/1996 Manabe ...................... 711/150
5,892,900 A    4/1999 Ginter et al. ................ 395/186

2003/0105916 A1 * 6/2003 Tsuchida et al. ............ 711/106

OTHER PUBLICATIONS

Berny Goodheart and James Cox; The Magic Garden Explained; Copyright 1994; Prentice Hall; pp. 71-76.*
Bugnion, E. et al., "Disco: Running Commodity Operating Systems on Scalable Multiprocessors", *Proceedings of the 16th Symposium on Operating Systems Principles (SOSP)*, 1997, 1-14.
Coffing, C.L. "An x86 Protected Mode Virtual Machine Monitor for the MIT Exokernel", *Submitted to the Department of Electrical Engineering and Computer Science*, May 21, 1999, 1-109.
Goldberg, R.P. "Survey of Virtual Machine Research", *IEEE Computer*, Jun. 1974, 34-45.
Popek, G.J. et al., "Formal Requirements for Virtualizable Third Generation Architectures", *Communications of the ACM*, Jul. 1974, 17(7), 412-421.
Smith, J.E. "An Overview of Virtual Machine Architectures", Oct. 26, 2001, 1-20.
Waldspurger, C.A. "Memory Resource Management in VMware ESX Server", *Proceedings of the 5th Symposium on Operating Systems Design and Implementation*, Dec. 9-11, 2002, 15 pages.

* cited by examiner

*Primary Examiner*—Tuan V Thai
*Assistant Examiner*—Midys Rojas
(74) *Attorney, Agent, or Firm*—Woodcock Washburn LLP

(57) ABSTRACT

A data storage resource is identifiable by physical addresses, and optionally by a virtual address. A policy defines which resources are accessible and which resources are not accessible. A request to access a resource is allowed if access to the resource is permitted by the policy, and if carrying out the access will not cause virtual addresses to be assigned to resources to which the policy disallows access. Since resources to which access is disallowed do not have virtual addresses, certain types of access requests that identify a resource by a virtual address can be allowed without consulting the policy.

32 Claims, 17 Drawing Sheets

USING LIMITS ON ADDRESS TRANSLATION TO CONTROL ACCESS TO AN ADDRESSABLE ENTITY

CROSS-REFERENCE TO RELATED CASES

This application is a continuation-in-part of U.S. patent application Ser. No. 10/124,609, entitled "Page Granular Curtained Memory Via Mapping Control," filed on Apr. 17, 2002, now U.S. Pat. No. 6,986,006 which is hereby incorporated by reference.

FIELD OF THE INVENTION

The present invention relates generally to the field of computing, and, more particularly, to a technique for restricting access to an addressable entity such as a computer memory.

BACKGROUND OF THE INVENTION

One feature—and undeniable advantage—of a general-purpose computer is its ability to perform a limitless array of functions. A computer has a set of instructions that it can carry out. A programmer can enable a computer to perform any task within its physical capabilities—e.g., mathematical computation, storage/retrieval of data, input/output, encryption/decryption, etc.—simply by providing the computer with the instructions (i.e. a program) to perform such a task. While the boundless versatility of the computer has been a boon to nearly every field of human endeavor, this same versatility also has a downside: since a computer can perform nearly any function, it can be instructed to do bad as well as good. The same computer that has been programmed to perform banking transactions, or restrict access to corporate secrets, or enforce licensing terms for copyrighted information, could also be programmed to raid customer bank accounts, divulge corporate secrets, or make illegal copies of copyrighted content. Any function that has been entrusted to a computer can be sabotaged by a malevolent programmer with unfettered access to the computer's capabilities. Thus, the task of building a computer that is resistant to such sabotage often comes down to limiting access to some of the computer's resources, so that those resources can only be used under appropriate circumstances.

One important set of resources to which access can be limited is the set of resources that store data—e.g., the computer's memory, registers, etc. These data storage resources may store valuable or sensitive data, such as cryptographic keys that protect commercially significant information, or passwords that protect access to bank accounts. The existence of this type of data presents a dilemma with regard to its use in a computer. For example, a computer that uses cryptography to protect information must know the cryptographic key that decrypts the information (or at least some representation of that key) and must be able to use this key to decrypt the information under the right circumstances. However the computer cannot give unfettered access to this key or else a dishonest person could simply distribute copies of the key to everyone in the world, which would destroy the protection scheme. The same can be said of various types of information: passwords, corporate secrets, and even the code that protects keys, passwords, and secrets. The computer needs this information to be in memory so that it can be used legitimately, but the computer must protect this information from being use illegitimately or maliciously. In view of these examples, it can be seen that much computer security can be achieved if some of the computer's memory (and other data storage resources) can be cordoned off so that access is granted when the attendant circumstances are right, and denied when they are not. Resources that have been cordoned off in this manner are sometimes called "curtained memory."

Various systems exist in which access to data storage is at least somewhat limited. For example, most modern operating systems implement the concept of an "address space," where each process is assigned (generally on a continually-changing basis) certain pages or segments of physical memory that the process can access through it's virtual memory mappings, and where a process cannot access pages (or segments) that are in another process's address space. In some sense, this scheme limits access to memory, since certain portions of the memory can be accessed only if the access request originates from the process to which the memory portion belongs). However, this scheme is easily subverted. Some processors allow physical memory to be accessed directly (i.e., without using the virtual memory mappings), so a process could simply execute an instruction to access a given physical address regardless of whether that address had been assigned to the process's address space. Even in a processor that disallows direct physical addressing of most memory (e.g., the INTEL x86 family of processors), the virtual memory mappings are generally stored in accessible memory, so a process can access memory outside of its address space simply by changing the virtual memory mappings to point to a physical address that the process is not supposed to access.

Some systems attempt to prevent unauthorized access requests by evaluating the allowability of each access request before it is executed. For example, a processor could trap all memory access instructions so that an exception handler can evaluate each memory access request. However, such a system is inherently inefficient, since every access request must await evaluation before it can proceed.

What is needed is a way to define the logical conditions under which a limitation on access to resources can be ensured and perpetuated, and a system that can control access to resources by taking advantage of these logical conditions without having to specifically evaluate each access request. No such system has been realized in the prior art.

SUMMARY OF THE INVENTION

The present invention provides a technique for controlling access to resources, such as computer memory. The invention presumes that there is a policy under which certain requests to access resources are allowable, and others are not. The invention controls access to resources by denying access requests that are unallowable under the policy, and by also denying access requests that, if carried out, would cause a resource to which access is unallowable under the policy to have a virtual address. This latter constraint ensures that the resources are always in a state where the only resources that have virtual addresses are resources to which the policy permits access. Thus, certain types of access requests that identify a resource by its virtual address can be allowed without further evaluation, since the fact that a resource has a virtual address means that at least some type of access is allowable under the policy.

In accordance with the invention, an "invariant condition" is defined that places a constraint on which resources can have virtual addresses. The condition is "invariant" in the sense that it should be true when the resources are initialized, and should continue to be true following every access request (in every state that the machine can reach from the initial state). Access requests are thus evaluated according to two criteria. First, an access request is denied if the relevant policy, P, prohibits access to the requested resource. Second, an access request is denied if execution of the access request would cause the invariant condition to be violated. This second condition may cause some requests to be denied, even if the request is allowable under policy P. In this sense, the invention enforces a policy P' that is at least as restrictive as P.

When the resources are maintained in a state that satisfies the invariant condition, certain types of access requests can be evaluated more efficiently. For example, if the invariant condition is that a given source has no virtual address for any resource that the source is not allowed to access under the policy, then any read request that identifies a resource by virtual address can be granted without further evaluation, since only resources to which access is permitted under the policy have virtual addresses, and since read operations generally cannot change the state of the system to a state in which the invariant condition is untrue. Thus, this exemplary invariant condition enables an optimization in the evaluation of read requests. Other invariant conditions can be defined; different types of optimizations are possible depending upon the invariant condition chosen.

The optimizations that the invention enables may take the form of "selective filtering." Such filtering is based on the observation that the ultimate decision as to whether an access request will be allowed (i.e., whether it satisfies the conditions for allowance under policy P') may be complicated to evaluate, but it may be possible to identify various conditions that are sufficient to decide some (or many) access requests. This is particularly true when a proper invariant condition is chosen. In the example above, an invariant allows read requests to be allowed automatically if they identify the resource to be read by its virtual address. Thus, any access requests can be first evaluated to determine whether the request is such a read request; if that question is answered in the negative, then the system can evaluate the request under more complex criteria. Other invariant conditions can be chosen that allow other types of requests (e.g., write requests) to be evaluated more efficiently.

Other features of the invention are described below.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF THE INVENTION

Figure 1:
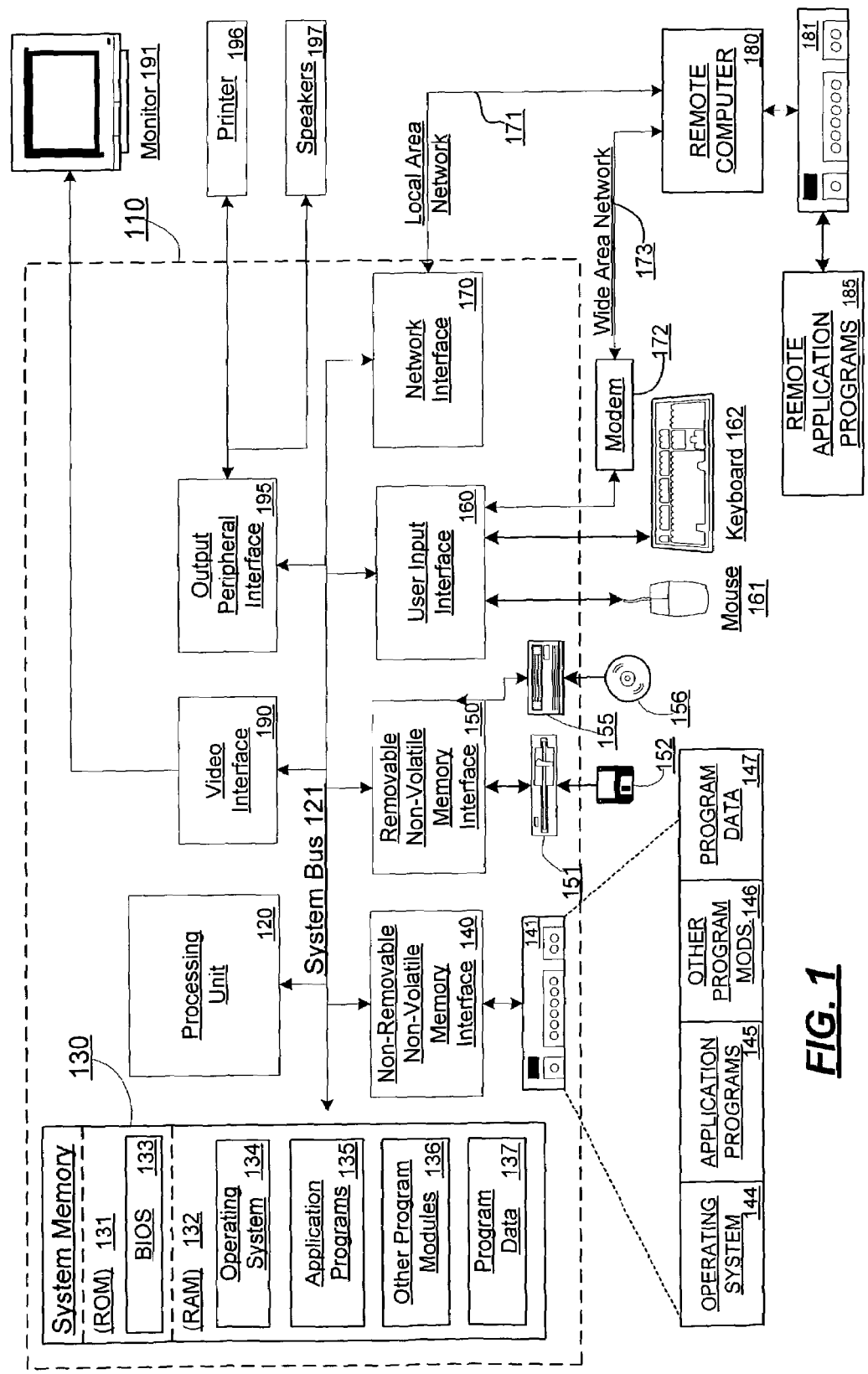
FIG. 1 is a block diagram of an exemplary computing environment in which aspects of the invention may be implemented.

FIG. 1 shows an exemplary computing environment in which aspects of the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, embedded systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Model for Access Control

For the purposes of this invention, the problem of access control can be modeled as:

A set of resources;
A set of sources;
A set of access modes;
A set of guards.

In this model, an access request is represented as a tuple (r,s,a,p), where r identifies a resource to which access is requested;
s identifies the source of the access request;
a identifies an access mode;
p identifies optional parameters of the access request.

An example of the foregoing model is a computer (e.g., computer 110, shown in FIG. 1) that evaluates and processes requests to access memory. For example, a computer's RAM (element 132, shown in FIG. 1), or an individual byte (or word, or double word) thereof, may be a "resource" to which access can be requested. A computer's registers are further examples of such "resources." Processes running on the computer are examples of "sources" that can issue access requests. "Access modes" may be "read" or "write" (indicating whether the source wishes to access the resource for the purpose of reading or writing). (One variation on this model omits access modes, in which case the access that is requested is plenary.) In a write request, the value that is to be written to (i.e., stored in) the resource may be a "parameter" of the request. The CPU (i.e., processing unit 120, shown in FIG. 1) may function as a "guard" for the resources, in the sense that it may be configured to trap or fault requests to write to certain registers or to certain portions of RAM 132, so that the request may be allowed or blocked based on the details of the request and the attendant circumstances. While it is convenient to envision the foregoing model in terms of its application to a computer, it should be understood that the model is logically self-contained and does not require a physical analogy for its completeness. Thus, it should be understood that the invention is not limited to access requests that are issued within a computer or any other particular type of device, but rather applies to any context that obeys the foregoing model.

A "policy" is a system of rules and conditions that describe which access requests are allowable, and may also define a set of actions that must be taken in conjunction with an allowed access request. Thus, the policy defines a function whose domain is the set of access requests (and possibly other information, which, as discussed below, can be collectively called the "environment"), and whose range is the Boolean values "true" (request allowable) or "false" (request unallowable), as well as the action(s) that must be taken in conjunction with the request. For example, a policy may say that source $s_1$ is not allowed to access resource $r_7$ under any circumstances; thus, the policy applied to any request of the form $(r_7, s_1, a, p)$ would have the value "false" (not allowable). As another example, a policy may state that any resource may be accessed if the CPU is operating in kernel mode, so that any request made in kernel mode would have the value "true" (allowable). An example of an "action" that can be associated with a request is setting the value of a resource to zero if allowing the request results in changing the policy such that a new source s' gains access to a resource that was previously restricted.

A "guard" gates access to resources based on policy. Thus, before an access request is granted, a guard for the requested resource examines the request and decides whether it should be granted based on available policy descriptions. In effect, the guard implements the policy.

A guard may be a hardware or software component that evaluates the policy function for each policy request and either allows or disallows access based on the function. Alternatively, the guard may implement a portion of the overall policy (a "sub-policy")—e.g., the guard may be designed to allow or disallow access requests that can be evaluated quickly based on some condition that is sufficient to decide a class of access requests (such as a guard that allows all access requests when the CPU is operating in kernel mode under a policy where all such access requests are allowable), and may defer requests that require a more complex evaluation to other guards. (As discussed below, such a set of guards may equivalently be described as a single guard that implements the policy, where the guard is composed of "sub-guards," where each sub-guard decides a certain class of access requests and passes other requests along to the next sub-guard.) Furthermore, in some cases no action is required to evaluate the request, in which case the guard exists implicitly. For example, if conditions have been set up such that an entire class of access requests is allowable (or unallowable), then the guard may not have to take any action at all to evaluate the request; nevertheless, the presence of these conditions constitutes an "implicit" guard, since the presence of the conditions ensures that access to a resource can only be obtained when permitted by the policy. Examples of conditions that permit this type of access control are described below in connection with FIG. 17 et. seq.

Figure 2:
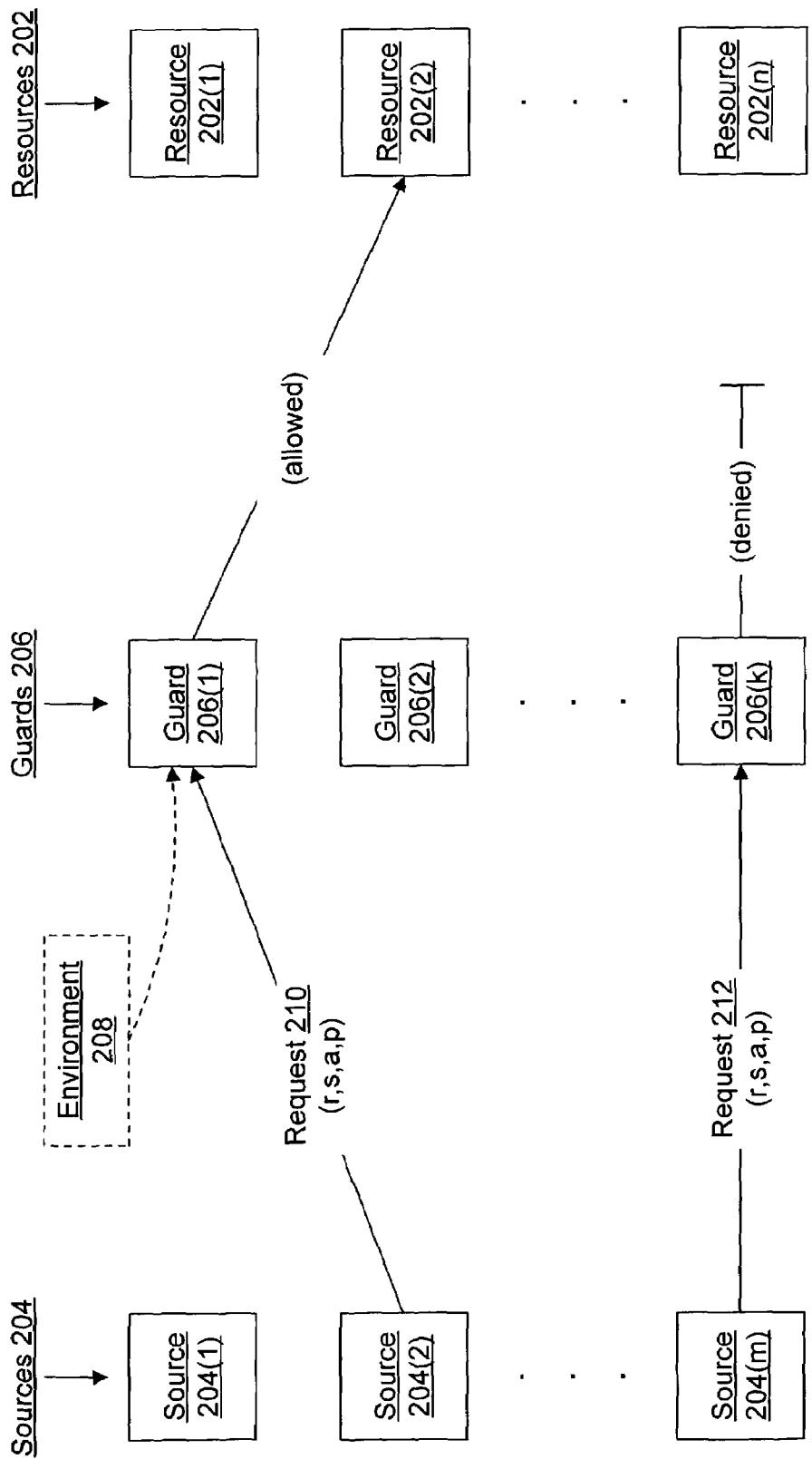
FIG. 2 is a block diagram of an exemplary environment in which an access request may be made and evaluated.

FIG. 2 shows an example of how access requests are processed in the presence of a policy implemented by a guard. Resources 202(1), 202(2), ..., 202(n) (collectively referred to as resources 202) are entities to which access can either be allowed or disallowed. Sources 204(1), 204(2), ..., 204(m) (collectively referred to as sources 204) are entities that can issue access requests for resources 202. Guards 206(1), 206(2), ..., 206(k) (collectively referred to as guards 206) are entities that gate access to resources 202.

In one example, source 204(2) issues a request 210 to access resource 202(2). Guard 206(1) evaluates request 210. In evaluating request 210, guard 206(1) may consider the values r, s, a, and p associated with request 210, and optionally considers environment 208. (Environment 208 may comprise any information other than r, s, a, and p—e.g., the mode in which a processor is operating, the identity of the currently-logged in user, the time, the temperature, the phase of the moon, etc.) Guard 206(1) determines that request 210 is allowable under the applicable policy, so guard 206(1) allows access to resource 202(2).

In another example, source 204(m) issues a request 212 to access resource 202(n). Guard 206(k) evaluates request 212, and determines that this request is unallowable under the applicable policy. Thus, guard 206(k) denies request 212, so source 204(m)'s attempt to access resource 202(n) fails.

It should be noted that there may be a variety of reasons for which guard 206(1) is chosen to evaluate request 210, and for which guard 206(k) is chosen to evaluate request 212. For example, guard 206(1) may be assigned to evaluate all requests to access resource 202(2), or all requests that originate with source 204(2), or a request may be randomly assigned to any guard that is not busy processing another request. Analogous rules may cause request 212 to be evaluated by guard 206(k). Alternatively, the guards may each implement a slightly different portion of the policy, and each request may work its way through all of the guards in some order until either the request is allowed or the guards have been exhausted. For example, guard 206(1) may be designed to allow all requests that can be allowed based on some simple criterion, and may pass requests that fail to satisfy this criterion along to other guards 206(2) through 206(k) for further evaluation. Alternatively, there may be a single guard that evaluates all access requests.

Model for a Machine in Which Access and Access Control Occur

The preceding discussion describes the abstract notion of a resource, and notes that computer memory and registers are specific examples of resources. The following is a formal discussion of a particular type of resource (or collection of resources) called an "addressable entity." It will be seen from the discussion below that computer memories, registers, disks, and tapes, are all examples of addressable entities. As noted in the preceding discussion, an access request is given by (r,s,a,p), which includes an identification of a particular resource r. An addressable entity provides a model of how a particular resource can be identified or "addressed."

For the purpose of the model, the terms V, A, and M will be used as follows:

V is an arbitrary set;
A is an arbitrary set;
M is an arbitrary set.

These may be distinct, but need not be—i.e., the members of one set may, or may not, appear in other sets.

Figure 3:
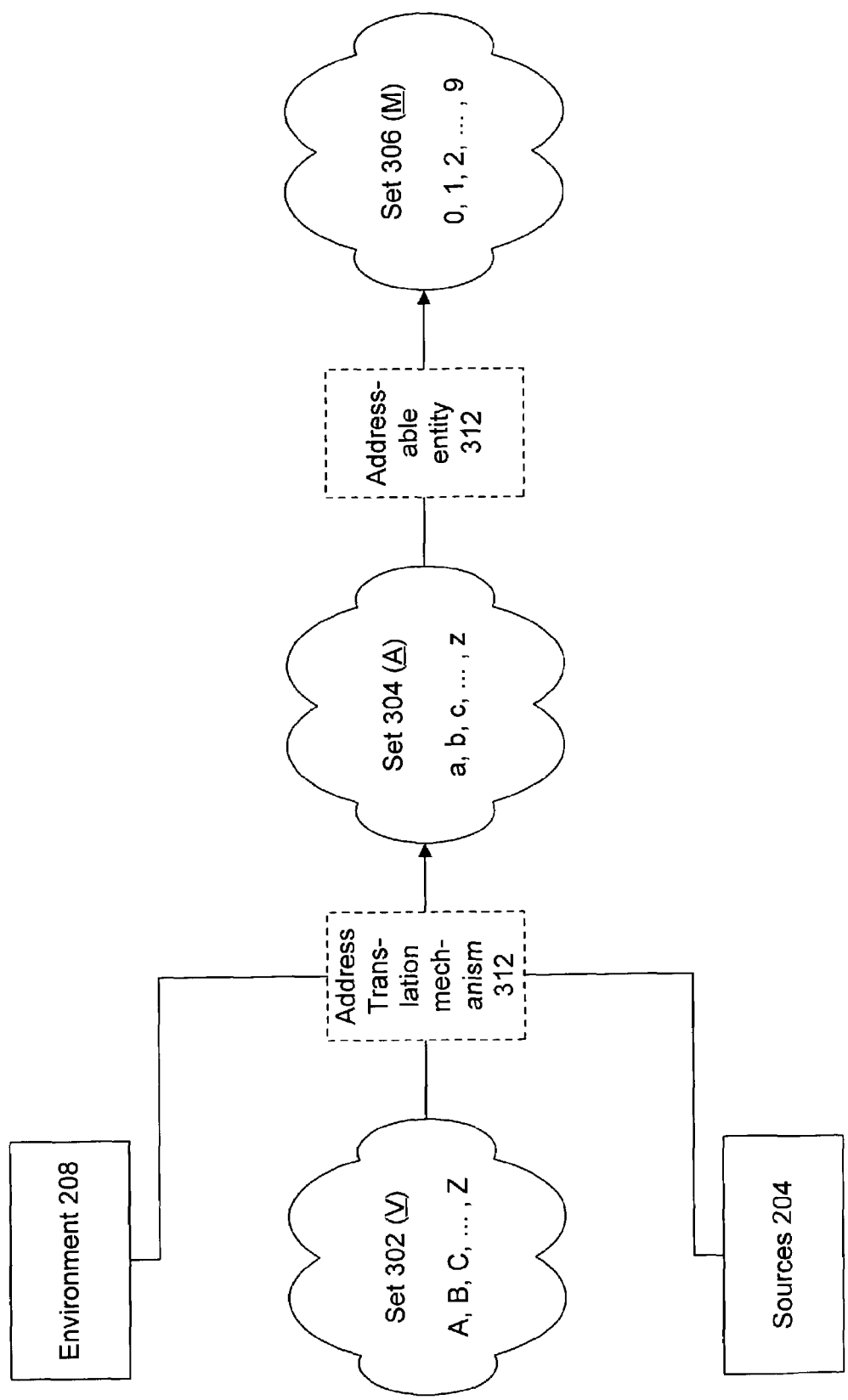
FIG. 3 is a block diagram of three sets and the relationship between them, which provides a model of how resources may be addressed.

FIG. 3 shows an example of the sets V, A, and M. Set 302 is V, set 304 is A, and set 306 is M. In the example of FIG. 3, V is the set of uppercase letters (A-Z), A is the set of lowercase letters (a-z), and M is the set of numerical digits (0-9).

An addressable entity is a modifiable mapping from A to M. That is, at any given moment, the addressable entity defines a function f: A→M, such that f(a)=m, where a∈A, and m∈M. The mapping is modifiable in the sense that it can change. FIG. 3 shows addressable entity 312, which is a mapping from set 304 (A) into set 306 (M). Thus, given any element of A (e.g., the lowercase letter "k"), addressable entity 312 indicates a particular element of M (e.g., the digit "7"). (Address translation mechanism 310 defines at least a partial modifiable mapping from V to A; address translation mechanism 310 is further discussed below.)

Figure 4:
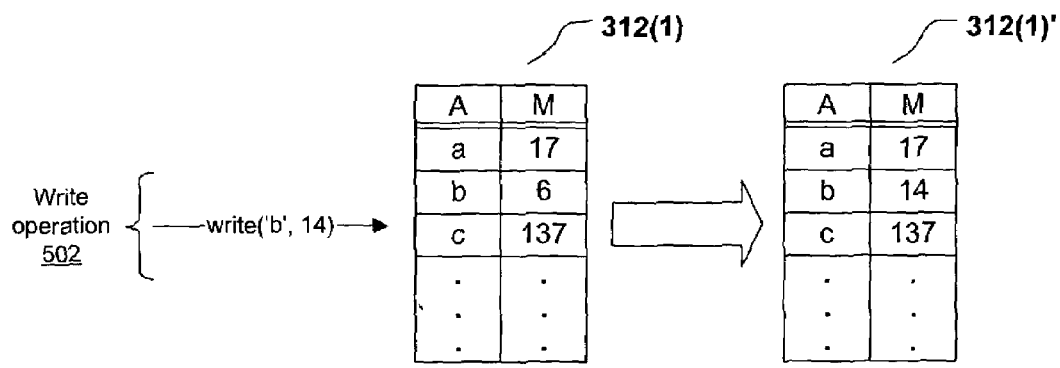
FIG. 4 is a block diagram of an exemplary addressable entity.

As a simple example, addressable entity 312 can be viewed as a table that correlates members of A with members of M. FIG. 4 depicts a simple addressable entity 312(1), where each row of the table has a member of A on the left, and a member of M on the right. Thus, in the example of FIG. 4, if f is the function defined by addressable entity 312(1), then f('a')=17, f('b')=6, f('c')=3, and so on. (In the discussion of FIGS. 4-6, the symbols 'a', 'b', and 'c', etc., enclosed in single quotes, refer to the lowercase letters that are members of the exemplary set A shown in FIG. 3.) In effect, each line of the table that defines addressable entity 312(1) is a "resource."

Returning to FIG. 3, a physical example of addressable entity 312 is a computer memory. (RAM 132, shown in FIG. 1, is an example of such a computer memory.) Instead of the sets A and M shown in FIG. 3, imagine that A is the set of integers from 0 to $2^{28}$–1 (representing the individual byte addresses for 256 megabytes of random access memory), and that M is the set of integers from 0 to 255 (representing the 256 different values that can be stored in one byte of memory). In this case, the memory physically embodies a mapping from A to M. That is, given any address between 0 and $2^{28}$–1, the memory indicates which of the 256 different one-byte integers is stored at that address. In this sense, the memory maps elements of A to elements of M, since the memory defines, at any given moment in time, which element of M corresponds to a particular element of A. Furthermore, the mapping is "modifiable" in the sense that it can be changed by writing new values to the memory. Likewise, registers, disks, tapes, punch cards, and most other media that are capable of storing data are examples of addressable entities: a register can be addressed by its register number; a byte on a disk can be addressed by its track, sector, and offset; a byte on a tape can be addressed by its offset from a specified marker; a byte on a punch card can be addressed by the card's sequence in a known deck and the byte's offset from the left-hand side of the card. However, it should be understood that the term "addressable entity" includes any structure that embodies the mapping described above, and is not limited to computer memories or to any of the aforementioned devices.

Addressable entities expose two access operations:
Read: A→M. Functionally, read(a) returns f(a);
Write: A×M.

Figure 5:
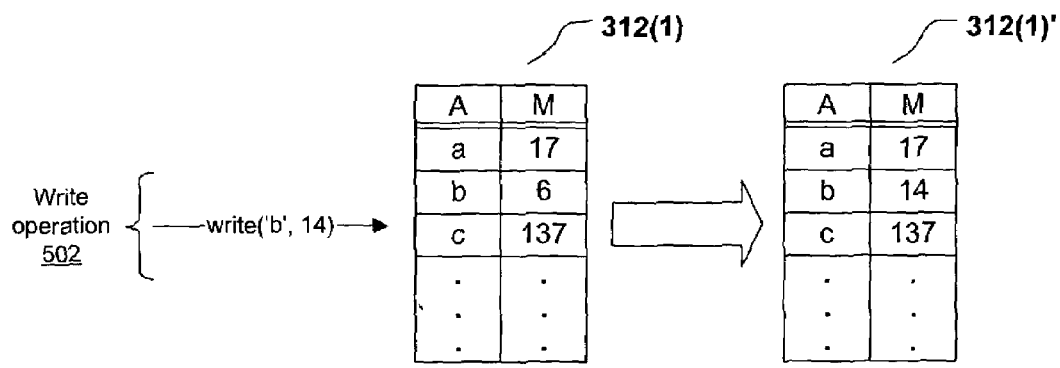
FIG. 5 is a block diagram of a write request on an addressable entity, showing the resulting mapping modification.
Figure 6:
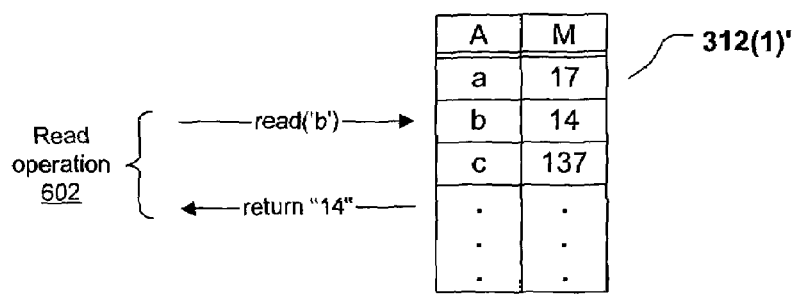
FIG. 6 is a block diagram of a read request on the modified mapping produced by the read request of FIG. 5.

If f is the function defined by the A→M mapping, then functionally read(a) returns f(a), where a∈A. (In the preceding sentence, the symbol "a" denotes an element of the set A, rather than an access mode, as in the request (r,s,a,p) discussed above. Where it is not otherwise clear from context, we will specify which meaning the symbol "a" has.) Typically, the write function modifies the mapping A→M, Thus, write(a,m) (for a∈A, m∈M) changes the function f, such that f(a)=m. Additionally, write(a,m) may result in a change to f(a') for some a'≠a, or, more generally, may cause some other change other than setting f(a)=m. Typically, the effect of write(a,m) is that it will cause future executions of the operation read(a) to return m (assuming that no intervening write (a,m') for some m'≠m has occurred), although the concept of an addressable entity is not limited to any particular set of semantics. With reference to FIGS. 5 and 6, a write operation 502 ("write('b',14)") on the simple addressable entity 312(1) changes the mapping to 312(1)', by changing the value "6" to "14" on the line whose set "A" value is 'b'. If read operation 602 ("read('b')") is subsequently performed on mapping 312(1)', this read operation will return the value "14," since write operation 502 has changed the original mapping 312(1) such that the set A element 'b' now maps to the set M element "14". As noted above, the semantics that allow a read operation following a write operation to return the value that was written are exemplary, but not definitive, of an addressable entity. As discussed below, there are examples of addressable entities whose read and write operations have different semantics.

Figures 7, 8, 9:
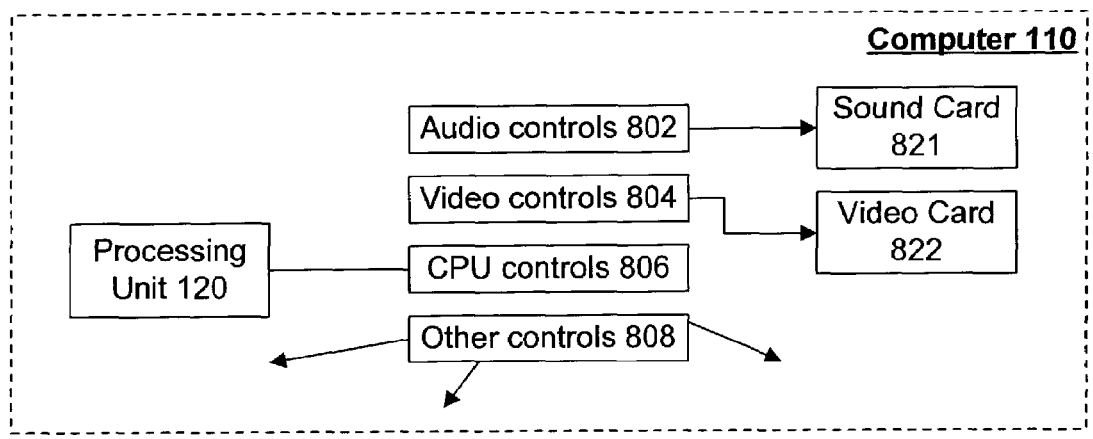
FIG. 7 is a block diagram of a random access memory.
FIG. 8 is a block diagram of a set of control registers.
FIG. 9 is a block diagram of a set of CPU registers.

The following are some real-world examples of addressable entities:

Physical random access memory (e.g., RAM 132, shown in FIG. 1). This type of addressable entity has the semantics mentioned to above—i.e., that the write operation is used to modify the mapping, and write(a,m) followed by read(a) returns m. FIG. 7 shows an example of RAM 132 as an addressable entity. RAM 132, in this example, comprises $2^{28}$ bytes, each having a physical address in the range 0 to $2^{28}$–1. The physical addresses correspond to the set A, and the possible byte values that can be stored at these addresses correspond to the set M. In this example, the value 17 is stored at address 0, 6 is stored at address 1, 137 is stored at address 2, and so on.

Control registers. In this type of addressable entity, the write operation is typically used for configuration beyond changing f at the indicated address. For example, writing to control or data registers of the chipset or peripherals may produce or change sounds in a sound card, or change the video display or change the machine state in some fundamental way. FIG. 8 shows a computer comprising some exemplary control registers. Computer 110 comprises audio controls 802, video controls 804, CPU controls 806, and other controls 808. Each of these control registers is an addressable entity.

For example, writing values to audio controls 802, may change the sounds in sound card 821. Writing values to video controls 804 may change some aspect that is managed by video card 822 (e.g., the resolution of a display). Writing values to CPU controls 806 may change some aspect of processing unit 120's behavior—e.g., a change from kernel mode to user mode, or a change in the virtual addressing scheme employed by processing unit 120. Other controls 808 may control other aspects of computer 110. FIG. 8 may provide an example of the situation that was alluded to above, wherein write(a,m) changes f(a') for some a'≠a. For example, writing a new value into video controls 804 may change the background color displayed on monitor 191, thereby causing many of the bits in a video RAM to change.

CPU registers. While, in practice, these registers are typically not identified by a numerical address in the same as are bytes of RAM, this difference is purely syntactic, since each register is somehow identifiable. Each register has an identifier of some sort, and these identifiers corresponds to the set A. FIG. 9 shows an exemplary set of CPU registers 900(0), 900(1), . . . , 900(15), which are named r0 through r15. Each of these registers, in this example, is capable of storing a 32-bit value. Register numbers in the range 0-15 correspond to the set A, and integer values from 0 to $2^{32}$ correspond to the set M. (Some control registers may, in fact, be CPU registers.)

Figure 10:
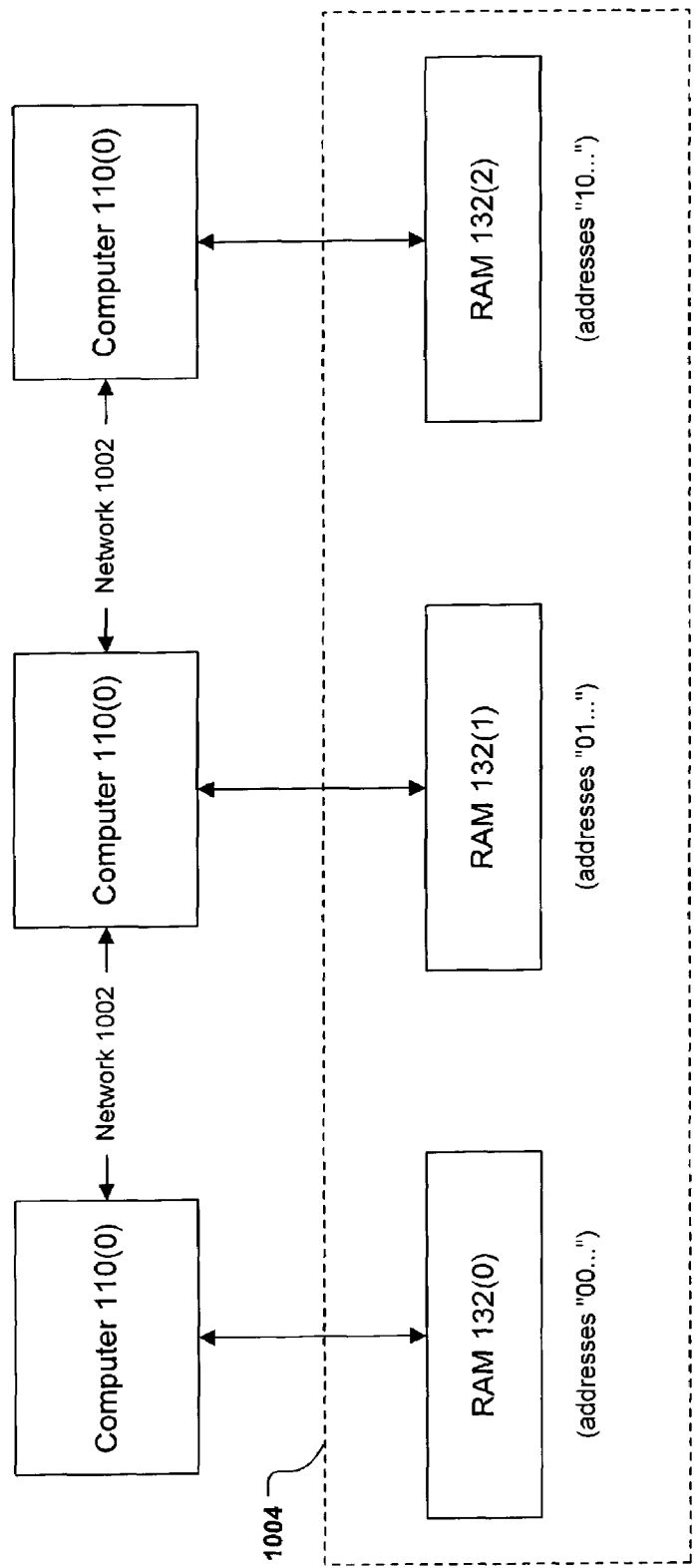
FIG. 10 is a block diagram of a simulated shared memory in a distributed system.

Simulated shared memory in a distributed system. Functionally, this memory resembles the memory in the first example. However, the physical storage on this memory may be distributed over many geographically separated machines. FIG. 10 shows an example of such a memory. Computers 110(0), 110(1), and 110(2) each have a RAM 132(0), 132(1), and 132(2), respectively. Computers 110(0) through 110(2) communicate via a network 1002 (which may, for example, be the local area network 173 or wide area network 171 shown in FIG. 1). Using network 1002, it is possible for each of the computer's to access one of the other computer's RAM. For example, computers 110(0) through 110(2) may engage in some type of message-passing protocol, whereby computer 110(0) can request that computer 110(1) retrieve some information from computer 110(1)'s RAM 132(1). An addressing convention can be set up so that a byte in any one of these RAMs can be identified with a single address: e.g., addresses in RAM 132(0) are prefixed with "00", addresses in RAM 132(1) are prefixed with "01", and addresses in RAM 132(2) are prefixed with "10". In this way, any byte in any of the RAMs 132(0) through 132(2) can be identified from any of the computers 110(0) through 110(2) by a single address, even though a given computer may issue an access request for a byte that does not reside on that computer's RAM. In this sense, RAMs 132(0) through 132(2) form a simulated shared memory 1004. This memory 1004 often has somewhat weaker semantics the RAM 132 shown in FIG. 7, or the control registers in FIG. 8. For example, if computer 110(0) performs the operations write(a,m) followed by read(a), the read operation may not return m, since either computer 110(1) or 110(2) may have written a different value to address a between the time of these operations. However, even though simulated shared memory 1004 may have different semantics from a traditional memory such as RAM 132, simulated shared memory 1004 is still a physical example of addressable entity 312. This example underscores that the invention is not limited to any particular type of addressable entity, but rather applies to any structure that obeys the model of an addressable entity as described above.

Returning again to FIG. 3, we now turn to address translation mechanism 310. Address translation mechanism 310 computes a partial modifiable mapping of S×V→A, where S is a set of sources (e.g., sources 204). This mapping defines a partial function g(s,v)=a, where s∈S, and v∈V. (Equivalently, the mapping may be computed in stages—e.g., S×V$_1$→S× V$_2$→ . . . →S×V$_n$→S×V→A.) Optionally, address translation mechanism 310 may take into account environment 208 (i.e., some arbitrary information, other than S and V), in which case the mapping is defined as S×V×E→A (and g(s,v,e)=a, where s∈S, v∈V, and e is arbitrary information about an environment E.) Virtual addressing is an example of a real-world system that can be implemented using address translation mechanism 310. In such an example, V is a set of virtual addresses, and address translation mechanism 310 allows memory to be addressed by a virtual address instead of a physical address by mapping virtual addresses (members of V) to physical addresses (members of A).

Figure 11:
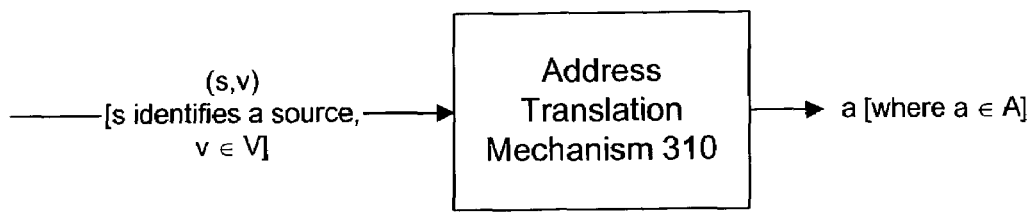
FIG. 11 is a block diagram of a first exemplary address translation mechanism.
Figure 12:
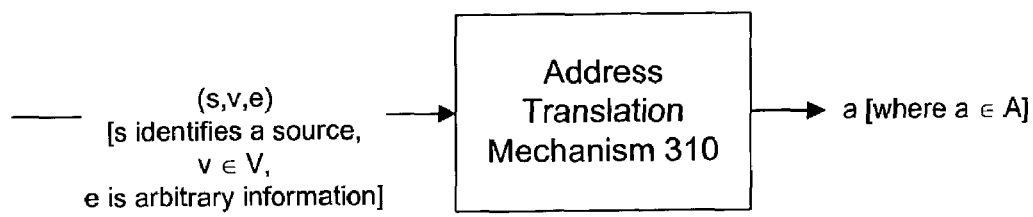
FIG. 12 is a block diagram of a second exemplary address translation mechanism.

FIG. 11 shows an example of address translation mechanism 310, which receives values s and v, and maps these values to a, where s identifies a particular source S, v∈V, and a∈A. FIG. 12 shows a similar example of address translation mechanism 310; however, in FIG. 12 address translation mechanism 310 also receives the value e, which is arbitrary information about environment 208, and takes e into account when computing the mapping to a. It should be noted that while the term "environment" may suggest that E contains information about the general conditions present at the time the mapping is computed, E is not limited to such information but rather may include any arbitrary type of information. For example, E may be the set of different types of access operations (e.g., read and write), such that a given virtual address (i.e., values of V) maps to different physical addresses (i.e., values of A) for read operations than it does for write operations. As another examples, some processors distinguish between instructions operations that read instructions (IFETCH) and operations that read data (DFETCH) (and a given virtual address may map differently in each case), in which case E can be used to specify whether an addressed that is being accessed contains data or instructions.

The mapping and function defined by address translation mechanism 310 are "partial" in the sense that they may not be defined for all possible domain values—i.e., there may be some s', v', and e', for which g(s',v',e') is undefined. For example, as discussed below a virtual memory system is an example of an address translation mechanism, where V is a set of virtual addresses; in a process that uses virtual memory, it is typically the case that large sections of the virtual address range are not mapped to any physical address. As an alternative to characterizing g as a partial function, it is possible to define g as a total function whose range is A∪{e}, where e is a special error symbol. The mathematical formalism employed is ultimately not relevant. It only matters that not all values of V are necessarily mapped to values of A, and that the lack of a mapping to A at a given point in g's domain manifests itself somehow.

It should be noted that the concept of an address translation mechanism 310 can be further extended in a variety of ways. For example, the range of the function g may include some dimension beyond A—e.g., g may produce not only a value a∈A, but also some arbitrary attribute. This attribute may indicate that the resource is read/write or read-only. As discussed below, some real-world address translation mechanisms may be adapted to enforce the read-only condition by denying write requests on read-only resources. (It should be noted that an attribute need not be strictly associated with a resource, but rather may be associated more generally with a point in g's domain. Thus, it is possible that g(s$_1$, v$_1$, e$_1$) and g(s$_2$, v$_2$, e$_2$) produce the same member of A but different attributes. This situation may correspond to the real world examples where $s_1$ and $s_2$, are both permitted to access a given resource, but one has read/write access and the other has read-only access. Alternatively, this situation may correspond to the example where read/write versus read-only access to a given resource depends on some facet of environment 208, such as user mode versus kernel mode. Further, these situations illustrate the real-world example where attributes of pages are stored in the V→A mapping (e.g., page tables, etc., as described below), and thus are a feature of the mapping rather than strictly a feature of the resource.)

As another extension to the model of FIG. 3, the computation of g may produce some external change, even a change to addressable entity 312. For example, where address translation mechanism is part of a real-world memory system, the computation of g may result in a change to a cache, a Translation Lookahead Buffer (TLB), etc.

Real-world examples of address translation mechanism 310 include virtual memory systems based on paging and segmentation schemes. FIGS. 13-16 depict examples of such real-world systems. It should be understood that pages and segments are merely a way of grouping addressable entities and into "buckets" so they can be dealt with conveniently in large units; the invention applies whether or not such addressable entities are grouped in this manner.

Figure 13:
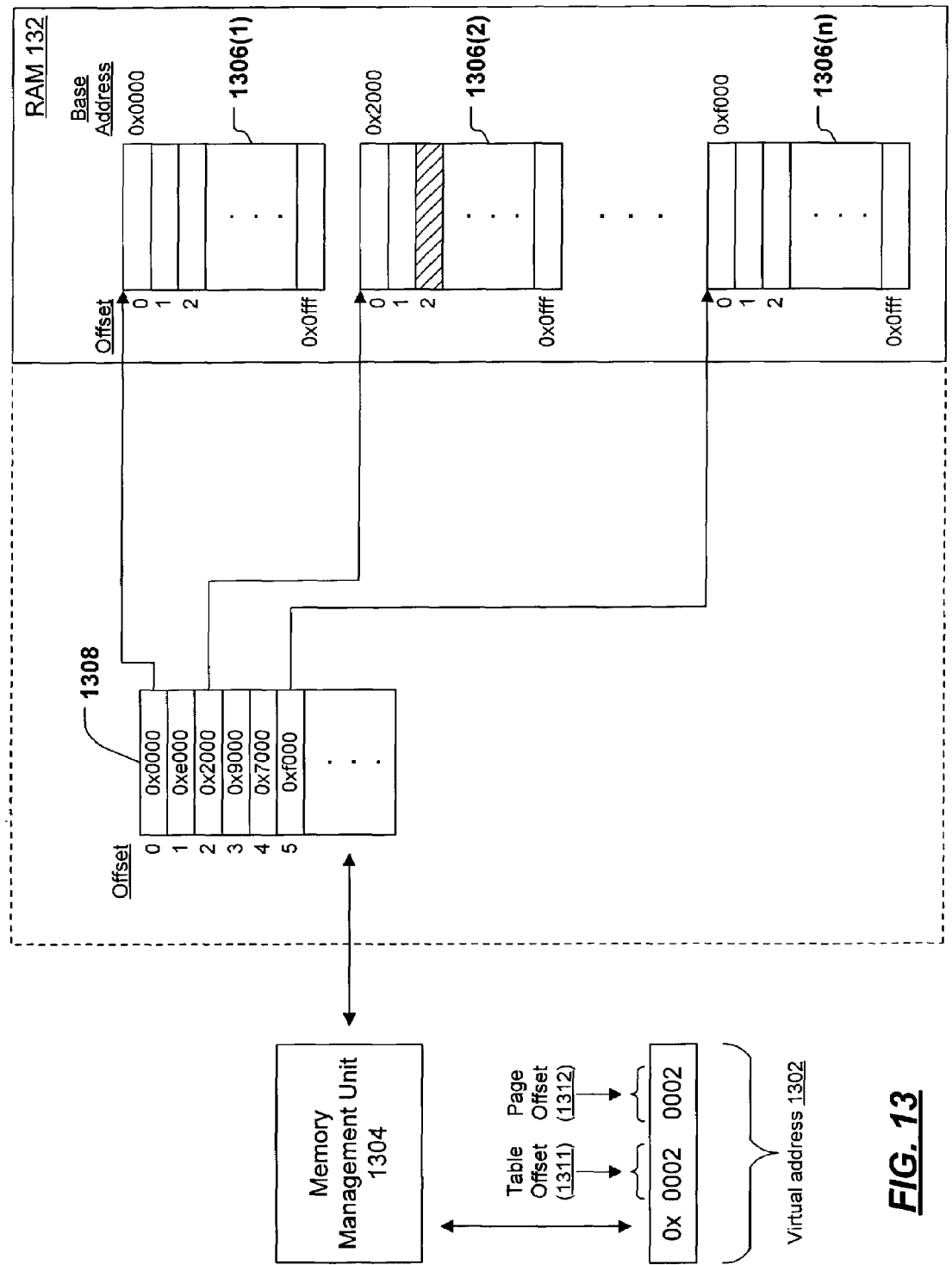
FIG. 13 is a block diagram of a first exemplary paging scheme.

FIG. 13 depicts an example of a paging scheme. In FIG. 13, fixed-sized portions of RAM 132 are designated as pages 1306(1), 1306(2), ... 1306(n). In the example of FIG. 13, each page is four kilobytes (4096 bytes) in length, although paging schemes are not limited to any particular page size (and some paging schemes support pages that have more than one size—e.g., where a page can be either four kilobytes or four megabytes in length). Each page has a base address in RAM 132. The base addresses of pages 1306(1), 1306(2), and 1306(n) are 0x0000, 0x2000, and 0xf000, respectively. (As will be recognized by those of skill in the art, the prefix "0x," by convention, indicates that a value is in hexadecimal, or base 16.) Within each page, each byte can be described by an offset relative to the page's base address. Thus, within each page the first byte has offset 0, the second byte has offset 1, and so on. Since each page in the example of FIG. 13 is 4096 bytes in length, the last byte of each page has offset 4095 (or 0x0fff).

Page table 1308 is a list of pointers to the various pages 1306(1) through 1306(n). Each entry in page table 1308 may also contain one or more "attributes" as described above—i.e., a marker that indicates whether the page pointed to by the pointer is read/write or read-only, or another marker that indicates whether the page is "present" in RAM 132 or "not present." (A page might be marked as not present if, say, it had been swapped to disk to make room in RAM 132 for other data.) Each element of page table 1308 contains the base address of a page in the page table. Moreover, each element can be identified by an offset into the page table. Thus, the element of page table 1308 stored at offset 0 is 0x0000, which is the base address of page 1306(1); the element stored at offset 2 is 0x2000, which is the base address of page 1306(2); and the element stored at offset 5 is 0xf000, which the base address of offset 1306(n). Other offsets into page table 1308 point to different pages that are not depicted in FIG. 13. It should be noted that page table 1308 is typically stored in RAM 132, and shown by the dashed line encompassing page table 1308.

Memory management unit (MMU) 1304 uses page table 1308 to convert a virtual address 1302 into a physical address. MMU 1304 may include hardware and software that performs various functions, including the translation of virtual addresses into physical addresses. In the example of FIG. 13, virtual address 1302 comprises two parts: a table offset 1311 and a page offset 1312. MMU 1304 identifies a particular physical address in RAM 132 based on virtual address 1302. In order to identify a physical address, MMU 1304 first reads table offset 1311, and uses this value as an index into page table 1308. Next, MMU 1304 retrieves whatever address appear in the page table 1308 entry defined by table offset 1311, and adds page offset 1312 to this value. The resulting value is the address of a particular byte in one of the pages 1306(1) through 1306(n). In the example of FIG. 13, table offset 1311 is 0x0002. Thus, MMU 1304 locates the base address stored at offset 2 from the beginning of page table 1308. In this case, that base address is 0x2000. MMU 1304 then adds page offset 1312 to the value located in the page table. Page offset 1312, in this example, is also 0x0002, so MMU 1304 adds 0x2000+0x0002=0x2002, which is the physical address of the byte in page 1306(2) that is indicated by slanted lines.

MMU 1304 may also be configured to perform some action based on the attribute(s) contained in the page table. For example, if the access request is to write to a byte of memory, and the page table entry for the page in which that byte is located indicates that the page is read-only, then MMU 1304 may abort the request and/or invoke some type of fault handler. Similarly, if the byte is on a page marked as "not present," then MMU may take steps to copy the image of the page back into RAM 132 from wherever that image is stored (e.g., disk), and/or may invoke some type of fault handler. As discussed below, one use of attributes is to mark any resource that can affect the function g (e.g., the portions of RAM 132 that store page tables, or segment tables (defined below), or page directories (defined below)) as "read-only" (or "not-present"). Using this technique, certain types of access requests (i.e., write requests when the "read-only" attribute is used; all requests when the "not present" attribute is used) can cause a guard to be invoked, which will evaluate the access request to ensure that the access request does not violate the policy and/or certain other conditions.

FIG. 13 is a specific example of the model shown in FIG. 3. FIG. 13 corresponds to the model of FIG. 3 as follows: The physical addresses of bytes in RAM are the member of set A; the 256 different values that a byte can store (e.g., 0 to 255 or −127 to +127) are the members of the set M; and the range of virtual addresses (e.g., virtual address 1302) are the members V. As explained above, in connection with FIG. 7, RAM 132 is an addressable entity. Moreover, MMU 1304 is an address translation mechanism, since it maps members of V (virtual addresses) to members of A (physical addresses). Moreover, the mapping implemented by MMU 1304 is partial, since it is possible that some virtual addresses do not map to any physical address (e.g., the virtual address 0x00060000 will not map to any physical address if page table 1308 has no valid entry at offset 6.)

Figure 14:
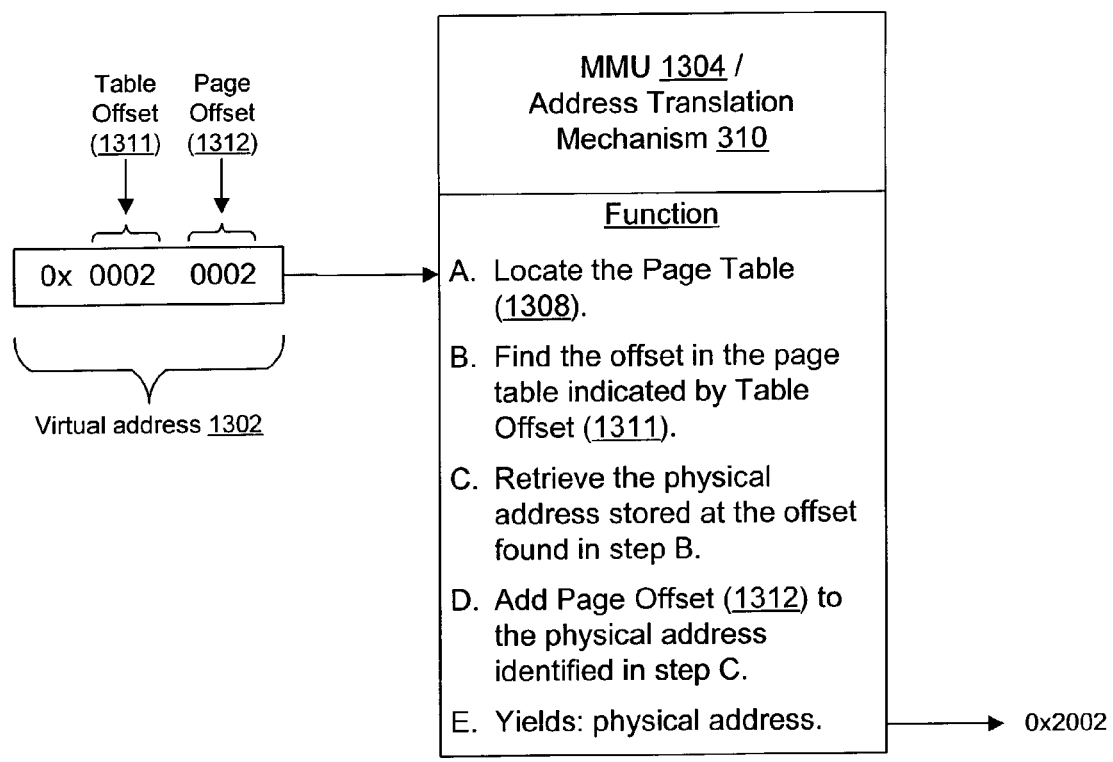
FIG. 14 is a block diagram of a third exemplary address translation mechanism, which is adapted for use with the exemplary paging scheme of FIG. 13.

FIG. 14 shows MMU 1304/address translation mechanism 310. MMU 1304 implements a function that: (A) locates page table 1308; (B) finds the offset in the page table indicated by table offset 1311; (C) retrieves the physical address stored at the offset found in (B); (D) adds page offset 1312 to the physical address retrieved in (C); and (E) produces the result computed in (D). The function implemented by MMU 1304/address translation mechanism 310 is an example of the function "g" mentioned above. The function implemented by MMU 1304 may also take certain action (e.g., aborting access requests, generating faults or exceptions, swapping pages into memory) depending on the state of the attributes, as described above.

Figure 15:
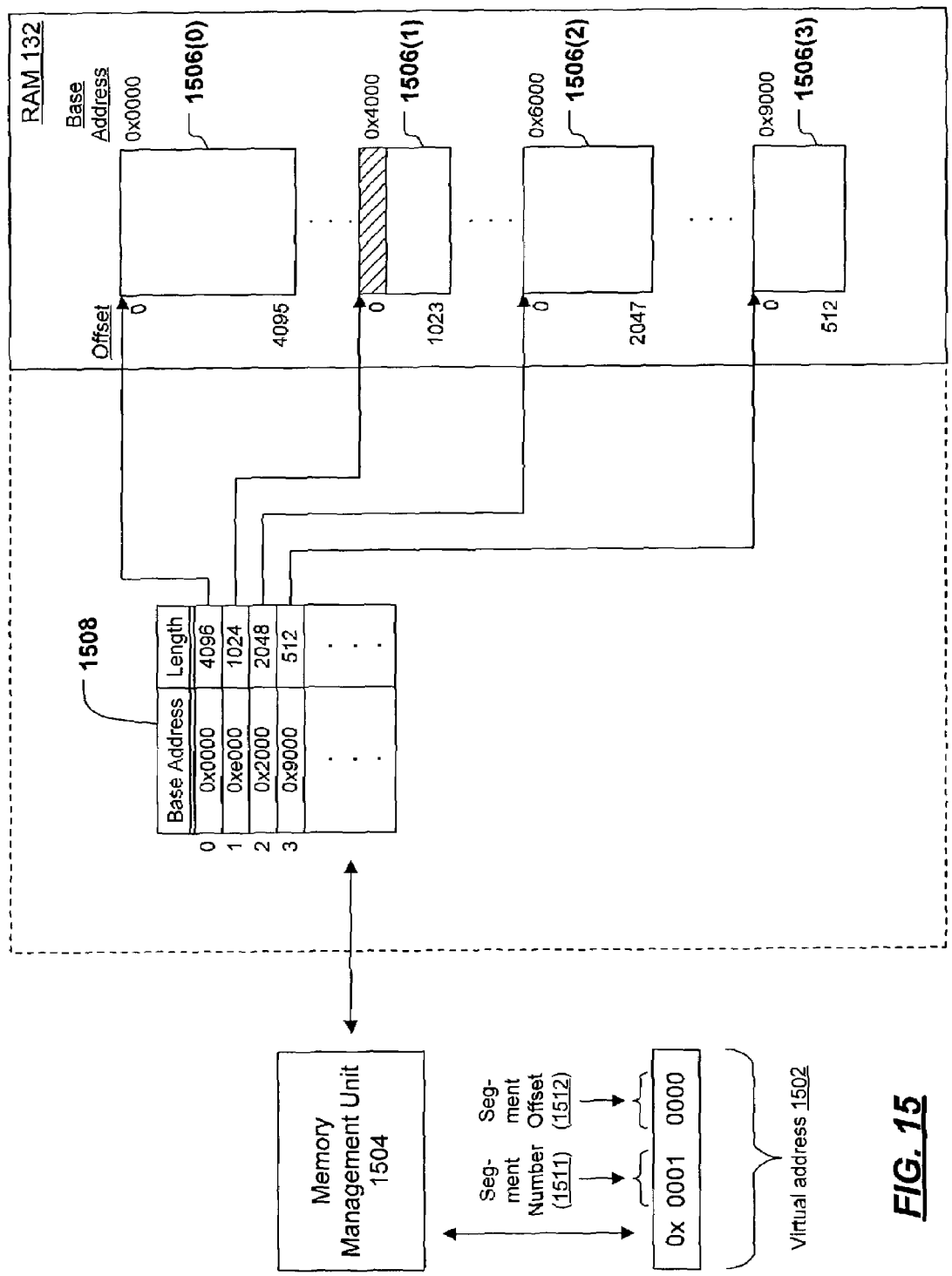
FIG. 15 is a block diagram of an exemplary segmentation scheme.

FIG. 15 depicts an exemplary segmentation scheme. In this example, sections of RAM 132 called "segments" are delimited; FIG. 15 shows four exemplary segments, 1506(0), 1506(1), 1506(2), and 1506(3). Each segment has a base address and a length. Segments may have different lengths. Segment table 1508 lists the base addresses and lengths of segments 1506(0) through 1506(3). Thus, segment 1506(0) begins at base address 0x0000 and has length 4096, segment 1506(1) begins at base address 0x4000 and has length 1024, and so on. Segment table 1508 is typically stored in RAM 132, as indicated by the dashed lines. Segment table 1508 may also list, for each segment, information such as read-only/read-write, present/not-present, etc., as described above.

MMU 1504 converts a virtual address 1502 into a physical address using segment table 1508. Virtual address 1502 comprises a segment number 1511 and a segment offset 1512. Thus, in the example of FIG. 15, MMU 1504 uses segment number 1511 as an offset into segment table 1508. In this example, segment number 1511 is "1", so MMU 1504 looks at offset 1 into segment table 1508, and locates the address 0x4000. MMU 1504 then adds segment offset 1512 (in this case 0x0000) to this address to create a physical address. Thus, 0x4000+0x0000=0x4000. Thus, MMU 1405 identifies the byte in segment 1506(1) indicated by slanted lines.

It can readily be appreciated that the segmentation scheme shown in FIG. 15 is another example of the model shown in FIG. 3, where MMU 1504 is an example of address translation mechanism 310. In particular, MMU 1504 implements a function g that converts virtual addresses (i.e., members of V) into physical addresses (members of A) based on the following formula:

$$g(sn,so)=f(SEG\_BASE+sn).base+so,$$

if sn<SEG_SIZE && so<f(SEG_BASE+sn).length;
otherwise g(sn,so) is undefined;

where sn and so are the segment number and segment offset portions, respectively, of a virtual address, where SEG_BASE is the physical base address of segment table 1508, where SEG_SIZE is the number of entries in segment table 1508, where "f" is the above-mentioned function that maps members of A (e.g., physical addresses) into members of M (e.g., values that are stored at those physical addresses), and where ".base" and ".length" return the base address and length fields, respectively, of a segment table entry.

Figure 16:
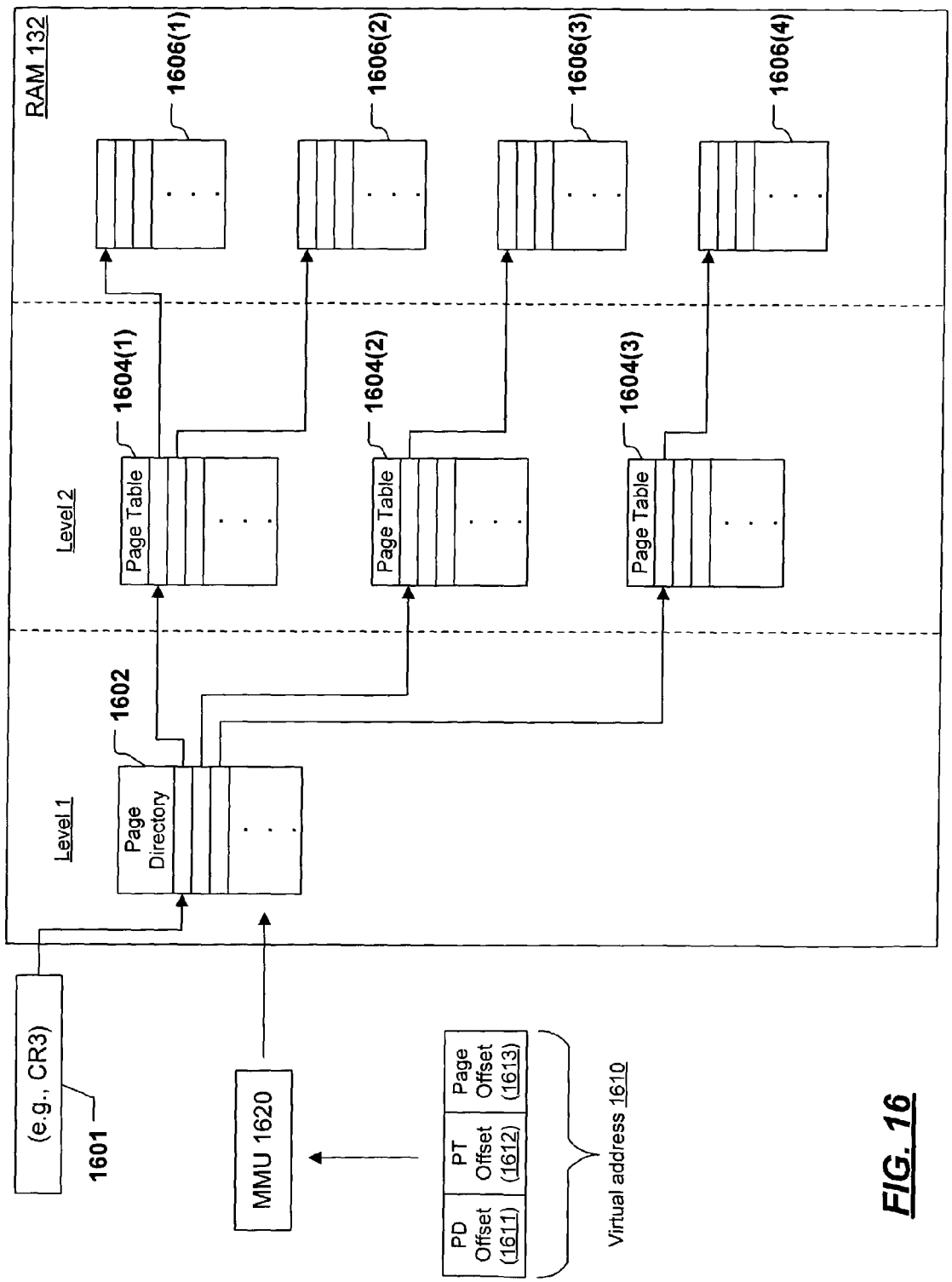
FIG. 16 is a block diagram of a second exemplary paging scheme.

FIG. 16 shows an example of a paging scheme, which is different from the paging scheme shown in FIG. 13. The paging scheme shown in FIG. 16 is a multi-level paging scheme, similar to the one used on an INTEL x86 processor. In this paging scheme, page directory 1602 contains an array of pointers to (i.e., physical base addresses of) page tables, such as page tables 1604(1), 1604(2), and 1604(3). Each page table, in turn, contains an array of pointers to the base addresses of pages (e.g., pages 1606(1), 1606(2), 1606(3), and 1606(4)), and may also contain information such as the read-only/read-write attribute, the present/not-present bit, etc., as described above. Pages are fixed-length portions of RAM 132. Additionally, the page directory and page tables are also typically stored in RAM 132. The paging scheme depicted in FIG. 16 is a two-level paging scheme, since it is necessary to go through both a page directory (level 1) and a page table (level 2) in order to locate a particular page. It will be appreciated by those of skill in the art that it is possible to design a paging scheme with an arbitrary number of levels, and the invention applies to all such paging schemes. It is also known in the art that the INTEL x86 processor typically uses the two-level paging scheme shown in FIG. 16, but can also be configured to use a one-level or three-level paging scheme.

In the paging scheme of FIG. 16, any byte on a page can be identified by a virtual address 1610, comprising a page directory offset 1611, a page table offset 1612, and a page offset 1613. Thus, in order to locate a physical address, an MMU 1620 uses page directory offset 1611 to locate a particular entry in page directory 1602. This entry is a physical base address of a page table, so MMU 1620 dereferences this address in order to locate one of the page tables (e.g., page table 1604(1)). MMU 1620 then uses page table offset 1612 as an index into the identified page table, and retrieves the entry found at that offset. The entry is the physical base address of a page (e.g., page 1606(1)), so MMU adds page offset 1613 to the base address of the identified page in order to locate a particular byte of physical memory. MMU 1602 may also be configured to take into account information such as whether a page has been marked read-only or read-write, whether the page is marked present or not-present, etc., as described above in connection with FIG. 13.

The MMU 1620 of FIG. 16 is yet another example of address translation mechanism 310; MMU 1620 computes a function (i.e., an example of function "g") that converts virtual addresses (i.e., elements of V) into physical addresses (i.e., elements of A).

The paging scheme of FIG. 16 also includes a storage location 1601 that contains a pointer to the page directory. MMU 1620 uses this pointer to locate the page directory 1602 when it begins to translate virtual address 1610. In the example of an INTEL x86 processor, storage location 1601 corresponds to the register named CR3—that is, on an INTEL x86 processor, the register CR3 stores the physical address of the page directory for the current context. Thus, it is possible to build alternative sets of translation tables (i.e., two or more sets of page directories and page tables), and to change which set of translation tables applies simply by writing the base address of a new page directory into storage location 1601. One common use of this technique is for each process running on a computer to have its own page directory and page tables, where a "context switch" (i.e., an operation that, among other things, causes the virtual memory system to point to the address space of a new process) is performed by writing the base address of the new process's page directory into storage location 1601. A process is an example of a "source" that can issue an access request, and as noted above the function g that an address translation mechanism 310 computes may be based not only on virtual addresses V but also on sources S—i.e., the same virtual address may translate to a different physical address depending on which source issues the request. In the case where each process has it's own page directory, the value stored in storage location 1601 is essentially an identification of the source, and thus allows address translation mechanism 310's computation of a physical address A to depend upon both the virtual address V as well as the source S that issues an access request. (It should also be noted that, to the extent that MMU 1620 implements the function g(s,v,e), s, v, and e need not be formally passed to a function g as parameters; rather, an address translation mechanism 310 may be said to define the function g: S×V×E→A so long as it somehow takes one or more of S, V, and E into account, as in the case where MMU 1620 takes the identity of the relevant source into account based on which address is loaded into storage location 1601.)

Algorithm for Controlling Access to an Addressable Entity

The following discussion describes an algorithm for controlling access to an addressable entity. In general, the algorithm denies access requests that are prohibited by a policy P, and also denies access requests that, if carried out, would violate some defined constraint on the set of resources that can be identified through address translation mechanism 310.

In effect, the algorithm implements a policy P' which is at least as restrictive as P, since the algorithm denies all requests that are unallowable under P, and also may deny requests that would violate the constraint, even if those requests are allowable under P. In general, this constraint (which will be called an "invariant" or "invariant condition") is chosen such that a given source, s, cannot access through address translation mechanism 310 those resources that s is not supposed to access under policy P. In a real-world virtual memory system, this constraint means that a process does not have a virtual address for any page or segment that the process is not supposed to access.

In this discussion, the sets V, A, and M, the environment E, and the functions f and g, have the meanings explained above. The algorithm described herein makes use a subset of A called MP(s), which is described below.

MP(s) is the range of g for a given source. More formally, for a given source s, MP(s) is the range of the function g(s,v, e), for v∈V and e∈E. It will be recalled that the function g produces members of A (i.e., g: S×V×E→A), so MP(s) is a subset of A (i.e., MP(s)⊆A)). Although the definition of MP(s) is not tied to any particular embodiment of model shown in FIG. 3, the meaning of MP(s) can be intuitively understood with reference to actually memory systems. In particular, MP(s) is the set of physical addresses that a given source can address through address translation mechanism 310—i.e., the set of physical addresses that have virtual addresses in a given context. MP stands for "mapped pages," and is thus named for the most prevalent type of virtual memory scheme. However, MP(s) has a meaning in any system that obeys the model developed in FIG. 3, and is not limited to a page-based virtual memory system, or to any particular type of memory system.

MP(s) has a specific meaning in the virtual memory systems of FIGS. 13, 15, and 16. For example in FIG. 13, MP(s) is the set of bytes contained in pages 1306(1) through 1306(n). Since each of these pages is pointed to by some element of page table 1308, it is possible to construct a virtual address for any byte in these pages. Thus, pages 1306(1) through 1306(n) are within the range of the function g that MMU 1304 implements. Similarly, in FIG. 15, MP(s) is the set of segments that are addressable through segment table 1508 (e.g., segments 1506(0) through 1506(3)). In FIG. 16, MP(s) is the set of pages (e.g., pages 1606(1) through 1606 (4)) that can be addressed through the multi-level pointers found in page directory 1602 and page tables 1604(1) through 1604(3). Additionally, FIG. 16 demonstrates why MP is parameterized by a source s: As discussed above, different sources of access requests (e.g., different processes running on a computer) can have different page directories and page tables. Since each source has its own set of page tables, the set of physical memory pages for which there is a virtual address 1610 may depend on the current source. That is, the set of pages identified in a source $s_1$'s page table may be different than the set of pages identified in source $s_2$'s page table, in which case MP($s_1$)≠MP($s_2$).

While the contents of MP(s) is defined by address translation tables (e.g., page directories, page tables, segment tables, etc.), it is also the case that MP(s) may include these address translation tables—that is, the address translation tables themselves may be stored in pages or segments that have virtual addresses. There is no requirement that the memory that contains the mapping be located outside of MP(s). As discussed below, it is possible to define an additional set called the Page Map Set ("PMS") that includes the pages that store these mappings, and certain embodiments of the invention make use of a particular relationship between PMS and MP(s). However, the definition of MP(s) is neutral as to whether page directories, page tables, and segment tables lie inside or outside MP(s).

The invention seeks to accelerate the process of evaluating access requests under policy P by constraining which resources can have virtual addresses—i.e., by placing constraints on the contents of MP(s). The basic idea is that if some constraint holds true about MP(s), then certain types of access requests that identify a resource by its virtual address (i.e., by a member of V) can never violate the policy. The exact nature of the constraint on MP(s) varies among embodiments, and some exemplary constraints are discussed below. As noted above, the term "invariant" or "invariant condition" will be used to denote generically such a constraint on MP(s), since this constraint represents some truth about the state of the resources that should not be changed by executing an access request.

One exemplary invariant is that resources that a source is prohibited from accessing should not have virtual addresses exposed to that source. In order to define this condition formally, we first define the set NA(P,s) as the set of resources that source s is not allowed to access under policy P—i.e., resources that source s is neither allowed to read nor to write. Thus, the exemplary invariant is defined as:

$$MP(s) \cap NA(P,s) = \phi$$

Figure 17:
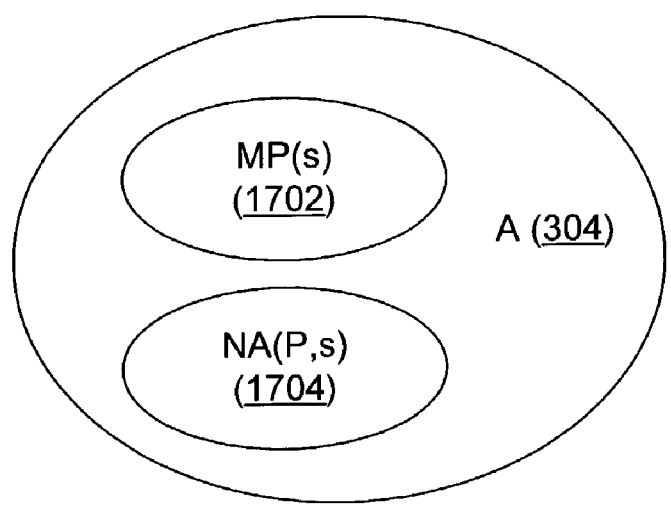
FIG. 17 is a block diagram of a first exemplary invariant condition.

This condition means that MP(s) and NA(P,s) are distinct and non-intersecting subsets of A. FIG. 17 shows this condition graphically in the form of a Venn diagram. That is, MP(s) (set 1702) and NA(P,s) (set 1704) are both subsets of A (set 304), but MP(s) and NA(P,s) have no members in common.

In a virtual memory system, the condition MP(s)∩NA(P, s)=φ essentially means that address translation mechanism 310 does not expose to source s a virtual address for any resource that source s is prohibited from accessing. This concept can be applied to the exemplary virtual memory systems shown in FIGS. 13, 15, and 16. In FIG. 13, the condition MP(s)∩NA(P,s)=φ means that page table 1308 does not list any pages that policy P prevents source s from accessing. In FIG. 15, this condition means that segment table 1508 does not list any segments that policy P prevents source s from accessing. In FIG. 16, the condition means there is no path from storage location 1601 to page directory 1602 to page tables 1604(1)-1604(3) that would lead to a page that policy P disallows source s from accessing. In the model of FIG. 3, the condition MP(s)∩NA(P,s)=φ means that the data on which address translation is based will not cause address translation mechanism 310 to point to any addressable entity that policy P disallows source s from accessing.

The significance of the condition shown in FIG. 17 is that, if MP(s) does not include any resources in NA(P,s), then it is never possible for source s to use the set V to identify any resource that source s is not allowed to access under policy P. With reference to the virtual memory system shown in FIGS. 13, 15, and 16, if the condition of FIG. 17 holds true, then there is no virtual address for any portion of RAM 132 for which access is prohibited under a given policy. As discussed below, this fact leads to various optimizations in the way that access requests can be evaluated. For example, as further discussed below, any read request that identifies a resource by its virtual address can be allowed without further evaluation, since, if MP(s)∩NA(P,s)=φ holds true, then the fact that the resource has a virtual address means that reading the resource must be allowable.

Figure 18:
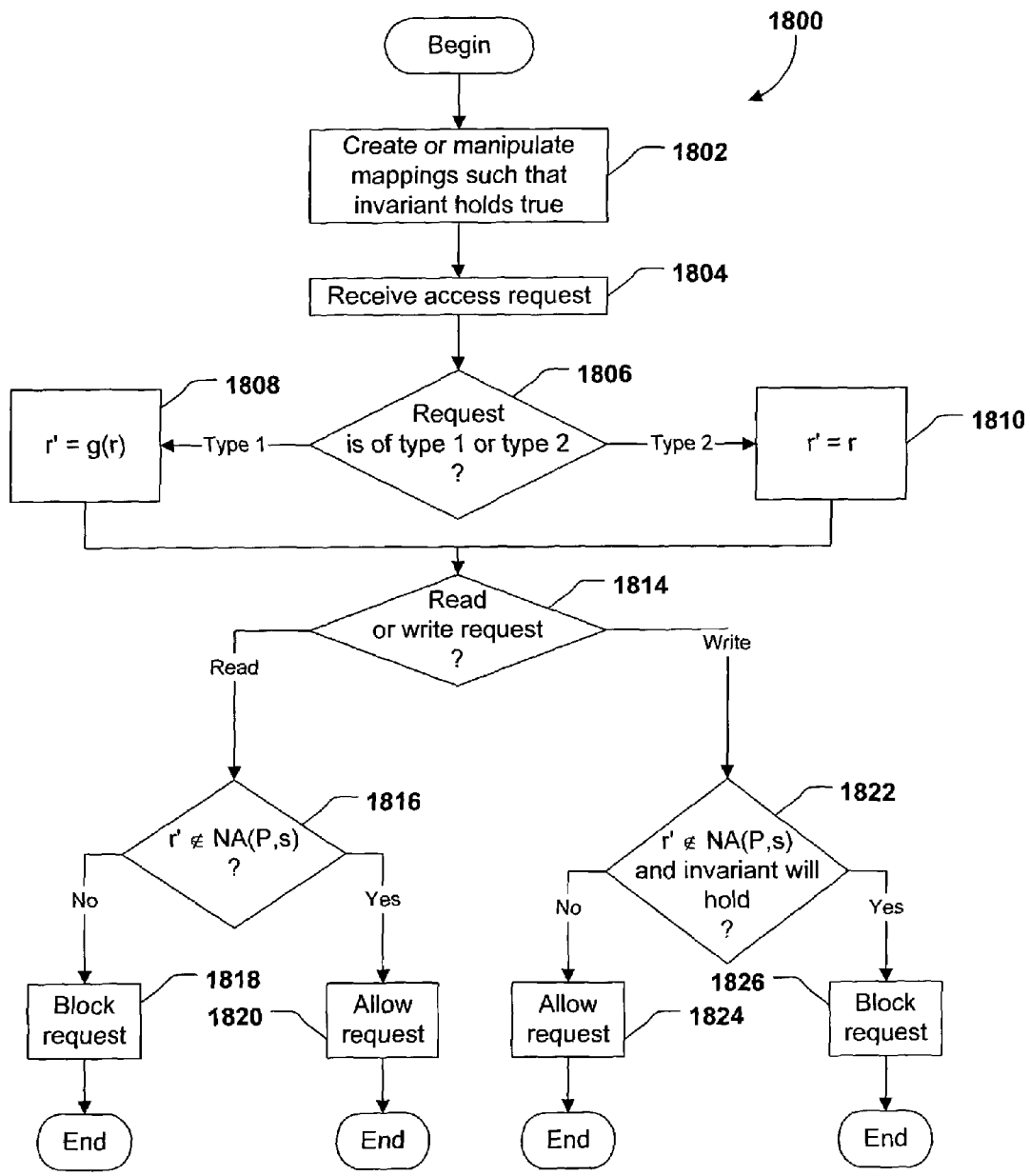
FIG. 18 is a flow diagram of an exemplary process for evaluating access requests.

FIG. 18 shows a method 1800 of enforcing a policy P, using an invariant condition, such as the one shown in FIG. 17. In particular, method 1800 denies access requests that are prohibited by policy P, and also denies access requests that, if carried out, would put the system into a state where the relevant invariant does not hold. Thus, method 1800 denies all access requests that are prohibited under policy P, and also may deny some access requests that are allowable under policy P. As noted above, this method effectively implements a policy P', which is at least as restrictive at policy P, and may be more restrictive. Method 1800 may be implemented by one or more of the guards 206 (shown in FIG. 2). In the description of FIG. 18, it will be assumed that method 1800 is performed by guard 206(1) (shown in FIG. 2), although the method can be performed by any entity, or combination of entities, that mediates access to a resource.

At step 1802, the system in which resources will be accessed is initialized into a state such that the relevant invariant condition holds true. This step is accomplished by creating and/or manipulating the mapping implemented by address translation mechanism 310 to produce a state that satisfies the invariant condition. For example, if the relevant system is that shown in FIG. 13, and if the relevant invariant is that shown in FIG. 17, then step 1802 may be performed by constructing page table 1308 such that it does not contain any of pages 1306(1) through 1306(n) that source s is not allowed to access under policy P.

After the system has been initialized, guard 206(1) receives a request to access a resource, r (step 1804). The access request identifies the resource, r, in some manner. As discussed above, FIG. 3 shows two ways of identifying a resource: (1) using address translation mechanism 310 (using an element of V); or (2) directly (using an element of A). These different ways shall be referred to as type 1 and type 2 access requests, respectively. In type 1 requests, r∈V, and in type 2 requests, r∈A. In the example of a computer system that supports virtual memory, a type 1 request identifies a resource by its virtual address, and a type 2 requests identifies a resource by its physical address. (It should be noted that type 2 requests include not only requests to access RAM 132 by physical address, but also physical-address-based requests for any other type of addressable entities, such as registers.) Guard 206(1) determines whether the request is of type 1 or type 2 (step 1806), and defines a value r' that identifies the requested resource in the A domain (i.e., r'∈A). Thus, if the request is of type 1, then r'=g(r) (step 1808). (Or, more precisely, if the domain of r is S×V or S×V×E, then r'=g(s,r) or g(s,r,e), where s identifies the source that issued the request, and e is optional arbitrary information about environment 208.) If the request is of type 2, then r'=r (step 1810). (It should be noted that some real-world systems—e.g., the RAM associated with INTEL x86 processors—require all memory access requests to be made by virtual address; effectively, these systems do not have type 2 addressing, in which case step 1810 would never occur.)

At step 1814, guard 206(1) determines whether the request received at step 1804 is a read request or a write request. If the request is a read request, method 1800 proceeds to step 1816; otherwise, method 1800 proceeds to step 1822.

If the request is a read request (step 1816), then guard 206(1), evaluates the condition r'∉NA(P,s)—i.e., whether r' is one of the resources that source s is not allowed to access under policy P. If r'∈NA(P,s) (decision: "no"), then guard 206(1) blocks the access request (step 1818). If r'∉NA(P,s) (decision: "yes"), then guard 206(1) allows the access request (step 1820).

Figure 19:
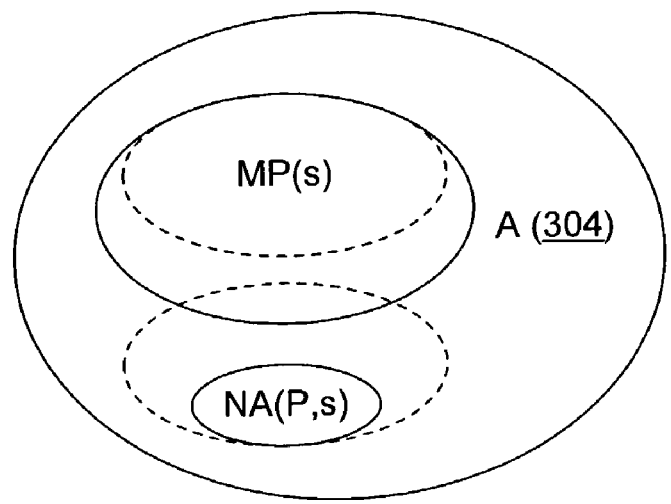
FIG. 19 is a block diagram of the two subsets of FIG. 17 before and after an exemplary access request.

If the request is a write request (step 1822), then guard 206(1) evaluates the conjunctive condition:

$$r'\notin NA(P,s) \char`\^ INV,$$

where INV is Boolean value of the invariant condition, as applied to the state that would result if the access request were carried out. In other words, for write requests guard 206(1) determines not only that the access is not prohibited under the policy (r'∉NA(P,s)), but also that executing the write request will not negate the invariant condition. For example, if the relevant invariant condition is the one depicted in FIG. 17, then guard 206(1) ensures that executing the write request will not cause MP and NA to have any resources in common. In the context of the virtual memory systems of FIGS. 13, 15, and 16, this condition means that write requests should be disallowed if they would result in assigning virtual addresses to bytes of RAM 132 that source s is not allowed to access. For example, with reference to FIG. 13, even if source s is allowed to write pointers into page table 1308, guard 206(1) should disallow such a request if carrying it out would result in writing into page table 1308 a pointer to a page that source s is not allowed to access under policy P. Moreover, if the policy itself is stored in resources that could be the object of an access request, then the condition described above means that executing the access request should not change the policy such that pages that already have virtual addresses come to be prohibited under the changed policy (unless, of course, a simultaneous change to MP also take place to remove those pages from MP). In general, step 1822 requires that the proposed access request will preserve the truth of condition INV, but is indifferent as to how this condition is preserved. When the invariant is that shown in FIG. 17, this condition may be preserved by (a) changing MP(s) (e.g., by changing the page or segment tables), (b) changing NA(P,s), or (c) changing both of these. For example, FIG. 19 shows the sets MP and NA both before and after a write request is executed. After the write request, NA expands such that it intersects with the original set MP. However, the write request also causes MP to shrink, so that it does not intersect with the new boundaries of NA. Thus, the condition evaluated at step 1822 may be affected by changes in the V→A mapping, a change in policy P, or both. (If NA gets smaller, this means that resources that used to be "off-limits" will become accessible, so it may be desirable to zero or randomize the contents of these resources in order to protect the previously-off-limits data from being read after the policy change. It should also be noted that shutting down the access control system is simply a special case of this—i.e., shutting down the access control system is equivalent to changing the policy so that NA has no members, in which case all of the resources that were formerly in NA are preferably zeroized or randomized. It should also be observed that storing the policy in an addressable entity is useful in itself, since it means, as demonstrated in FIG. 19, that changing the policy is a special case of the write operation.)

Returning to FIG. 18, if the condition shown in step 1822 is true (decision: "yes"), then guard 206(1) allows the access request (step 1824); otherwise (decision: "no"), guard 206(1) blocks the access request.

Optimization of Guards Based on Selective Filtering

As discussed above, a given policy P defines a Boolean function whose domain is the set of access requests (r,s,a,p) (and possibly an environment), and whose range is the Boolean values true (request allowable) and false (request unallowable) (and possibly a set of actions, such as read or write, indicating what type of action is permitted if the request is allowed). It is the function of guards 206 to evaluate the function defined by the policy—that is, given any access request, a guard computes either a true or false value. Sometimes, this calculation is expensive in terms of computing resources. For example, in method 1800 (discussed above in connection with FIG. 18), steps 1816 and 1822 call for determining whether $r' \notin NA(P,s)$. One way to evaluate this statement is for the guard to maintain some type of listing of resources that are in $NA(P,s)$ and compare every access request with this list. (E.g., if the resources are bytes of RAM 132, the guard could store the range(s) of physical addresses that s is not allowed to access, and, for each access request, determine whether the byte's address is in the prohibited range(s).) This technique works, but is not very efficient. Moreover, step 1822 calls for determining whether the condition INV is true, based on the future state of the system if the access request were carried out. This statement could be evaluated by simulating the execution of the access request and then testing the truth of that statement under the simulated conditions, but again, this technique is not very efficient. For some access requests, evaluation of the request may require performing an inefficient "brute force" calculation. However, it is preferable to design the guard so that many or most access requests can be evaluated without resorting to an inefficient calculation.

One way to optimize the evaluation of access requests is through selective filtering. In selective filtering, inexpensive tests are first applied to an access request. These tests typically embody conditions that are sufficient, but not necessary, to allow or reject (i.e., decide) the access request. If an access request cannot be resolved under these rules, then it is subjected to the "brute force" evaluation. Preferably, for a given policy P simple tests can be designed that are dispositive of the legality of large classes of access requests.

In general, one can view selective filtering as the following steps:

1. IF AR satisfies simple rule 1 for acceptance THEN accept AR

2. ELSE IF AR satisfies simple 2 for non-acceptance THEN reject AR

3. ELSE IF . . .

4. . . .

5. ELSE IF AR satisfies simple rule n . . . THEN . . .

Figure 20:
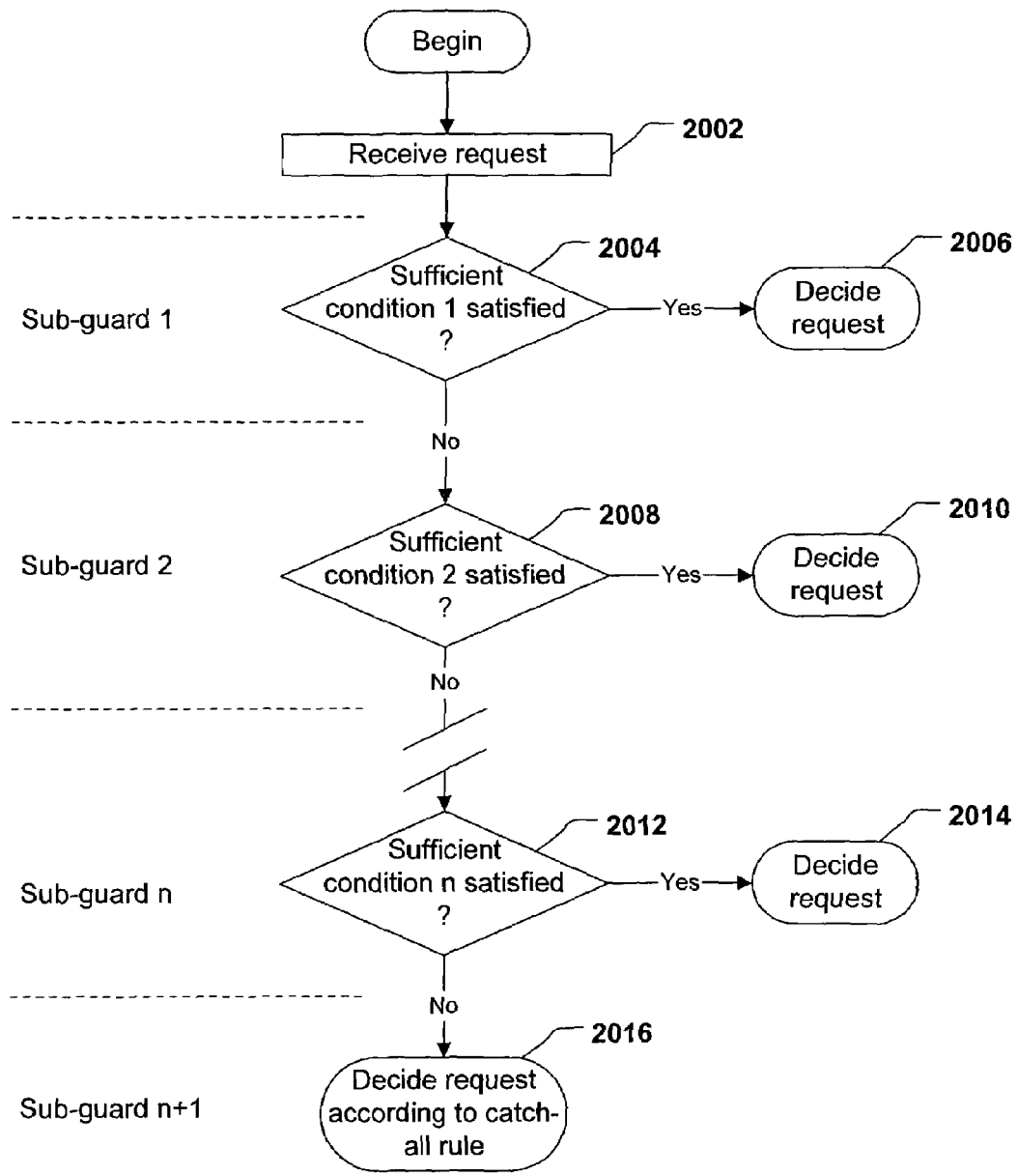
FIG. 20 is a flow diagram of a process for selective filtering.

6. ELSE test necessary and sufficient condition and treat AR accordingly FIG. 20 shows a generalized process for evaluating access requests using selective filtering. An access request is received (step 2002). A determination is then made as to whether the access request satisfies a condition whose existence would be sufficient to decide the request under the ambient policy (step 2004). If the condition is satisfied, then a decision is made on the request (step 2006) and the evaluation process terminates. If the condition at step 2004 is not satisfied, then it is determined whether the access request satisfies a second condition (step 2008). If the second condition is satisfied, then a decision is made on the request (step 2010). This cycle may be repeated as many times as there are conditions to test. FIG. 20 shows the case where there are n conditions; step 2012 determines whether the $n^{th}$ condition is satisfied, and, if so, a decision is made on the request at step 2014. If none of the n conditions is satisfied, then the request must be decided according to a "catch-all" rule (step 2016). This catch-all rule may be a computationally-expensive, brute-force rule of the type described above. Thus, this rule may accurately implement the relevant policy, but it may be difficult (i.e., costly of time) to apply the rule to an access request. Thus, it is preferable that the easier-to-evaluate conditions (e.g., conditions 1 through n, shown in FIG. 18) be dispositive of a large number of access requests, leaving only uncommon cases for the catch all rules.

It should be noted that the "decide request" blocks shown at step 2006, 2010, and 2014, do not necessarily mean that the request is allowed; in some cases, the condition tested leads to a quick denial of the request. Thus, each of conditions 2004, 2008, and 2012 is designed to "weed out" access requests that are easy to evaluate, but it is possible to "weed out" both access requests that are easy to deny as well as those that are easy to allow. Thus, for example, the condition at step 2004, if satisfied, may call for allowance of the request, and the condition at step 2008, if satisfied may call for immediate denial of the request.

It may be convenient to view the various conditions at steps 2004, 2008, and 2012 as dividing a guard into subguards. Thus, a particular guard evaluates a necessary and sufficient condition for evaluating access requests, and the guard performs this task using n+1 subguards: n subguards that test conditions that are sufficient (but not necessary) to decide an access request, and one subguard that tests for the necessary and sufficient condition if none of the n previous subguards were able to resolve the request.

Figure 21:
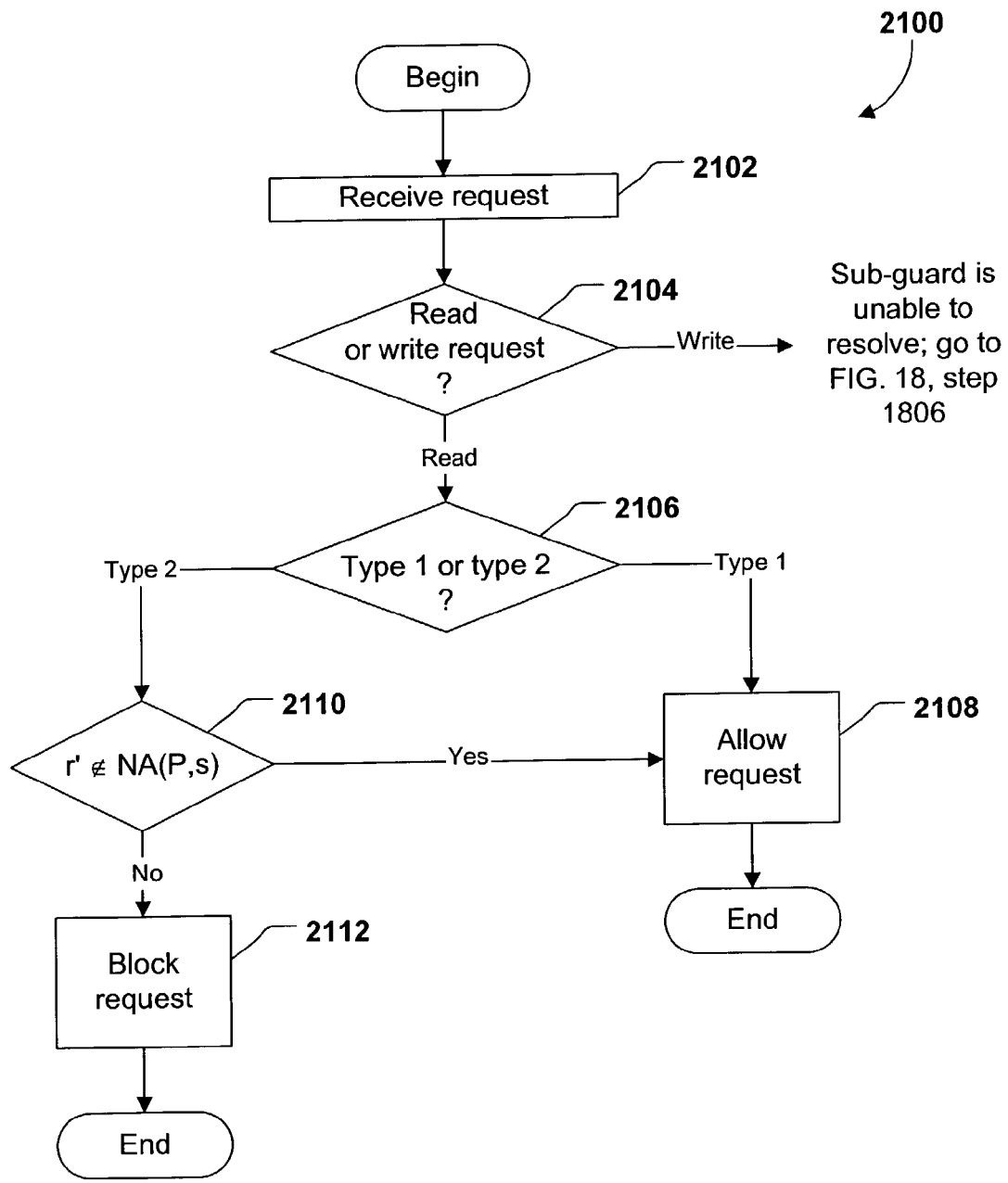
FIG. 21 is a flow diagram of an exemplary process for evaluating a read request.

One selective filtering optimization is to allow all type 1 read requests without further evaluation, and to perform the more complicated evaluation of FIG. 18 only if it is determined that an access request is not a type 1 read request. When the state of a machine satisfies the condition shown in FIG. 17, a type 1 read request will not change this condition (except in systems where a read request has the potential to create a state in which the relevant invariant condition does not hold—e.g., a system where a read access causes some side effect that has the potential to change the V→A mapping or the policy. It should be noted that, in a typical system, a read access does not have such an effect). FIG. 21 shows a process 2100 of evaluating such a request, which may be implemented by one of the "subguards" shown in FIG. 20.

In process 2100, an access request is received (step 2102). The subguard then determines whether the request is a read request or a write request (step 2104). If the request is a write request, then the subguard is unable to resolve the request. In this case, the request must be evaluated by process 1800, so the request is passed to step 1806 of FIG. 18 for evaluation. In essence, write requests fall to the "catch-all" rule. If, however, the request is a read request, then the subguard is able to evaluate the request. (Alternatively, some other optimization could be created for write requests, in which case the request would be passed to a sub-guard that attempts to decide the request based on such an optimization.) At step 2106, the subguard determines whether the request is a type 1 request or a type 2 request. It will be recalled that a type 1 request identifies a resource using set V (e.g., by virtual address), and a type 2 request identifies a resource using set A (e.g., by physical address). If the request is a type 2 request, then the subguard determines whether $r' \notin NA(P,s)$ (step 2110). (It will be recalled that r' identifies a resource based on set A—i.e., it is the physical address of the resource to which access is requested.) If $r' \notin NA(P,s)$ (decision: "yes"), the subguard allows the request (step 2108). If $r' \in NA(P,s)$ (decision: "no"), then the subguard blocks the request (step 2112). On the other hand, if step 2106 determines that the request is a type 1 request, then the subguard simply allows the request (step 2108). Since it is assumed that the condition of FIG. 17 was true before the access request was made, $r' \notin NA(P,s)$ is known to be true for all type 1 access requests. That is, since r' must be in the range of g (i.e., $r' \in MP(s)$) for all type 1 requests, and since the condition of FIG. 17 means that MP(s) has no elements in common with NA(P,s), it must be true that $r' \notin NA$ (P,s) for a type 1 request, so it is known that type 1 read requests are allowable under policy P. Moreover, since it has been assumed that read requests do not change the condition shown in FIG. 17, it is not necessary to take any additional steps to ensure that the FIG. 17 condition will hold in the future.

Other Invariant Conditions

The invariant condition shown in FIG. 17 is only one example of an invariant condition. Other invariant conditions may be defined, which have different advantages and may lead to different types of optimizations, or different degrees of security for the memory that should not be accessed under the policy. Some exemplary invariants are described below and shown in FIGS. 22-24.

Figure 22:
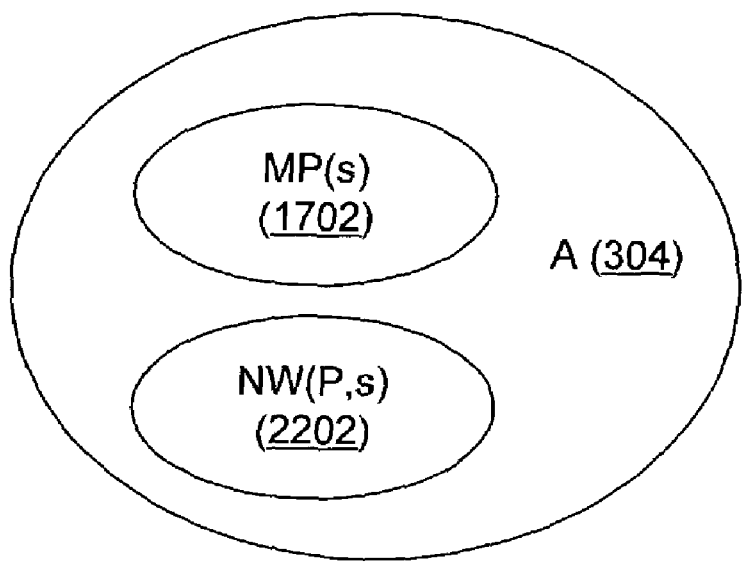
FIG. 22 is a block diagram of a second exemplary invariant condition.

FIG. 22 shows the invariant condition $$MP(s) \cap NW(P,s) = \phi,$$

where MP(s) has the same definition described above, and NW(P,s) is the set of resources that s is not allowed to write under policy P. This condition is similar to that shown in FIG. 17, but is more restrictive, since it specifies MP must exclude not only the resources that s is not allowed to access under the policy, but also those resources that s can access but cannot write under the policy. For example, if the policy allows s read-only access to certain resources, then these resources would be included in NW(P,s), even though they are not included in NA(P,s). In FIG. 22, it will be noted that both MP(s) (reference numeral 1704) and NW(P,s) (reference numeral 2202) are subsets of A (reference numeral 304).

Similarly, one could also define the invariant condition:

$$MP(s) \cap NR(P,s) = \phi,$$

where NR(P,s) is the set of resources that s is not allowed to read under policy P. (It should be observed that, in the examples above, NA(P,s)=NW(P,s)∩NR(P,s)—i.e., NA includes those resources that s can neither read nor write under policy P.)

Figure 23:
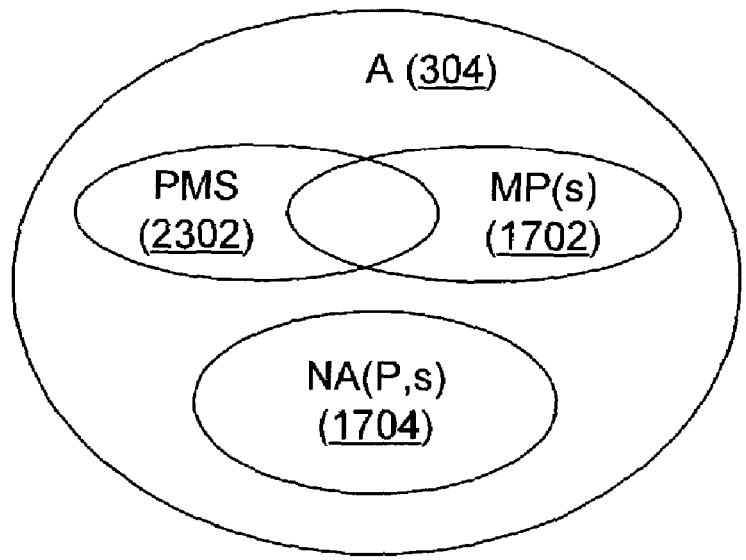
FIG. 23 is a block diagram of a third exemplary invariant condition.

FIG. 23 shows the invariant condition $$(MP(s) \cup PMS) \cap NA(P,s) = \phi.$$

In this invariant, PMS is the set of resources on whose value the mapping from V to A depends. (As explained above, PMS stands for "Page Map Set," although PMS can be defined for any system that has an address translation mechanism 310, regardless of whether that system is a page-based virtual memory system.) Using the previous definition of the functions f and g, PMS consists of all of the values a, such that f(a) affects the function g. For example, in a page-based virtual memory system, the contents of the page directory and page tables affect how virtual addresses are mapped to physical addresses, so the page directory/ies and page tables would be members of PMS. In FIG. 23, PMS (reference numeral 2302) is a subset of A (as are MP(s) and NW(P,s), as previously defined). Neither PMS nor MP(s) has any elements in common with NA(P,s). However, it will also be noted that FIG. 23 does not specify the relationship between PMS and MP(s). In the example of FIG. 23, PMS and MP(s) are shown as partially intersecting. However, the formal definition of the invariant condition imposes no such requirement. As an alternative to what is depicted in FIG. 23, PMS and MP(s) may be completely disjoint, completely identical, or one may be a subset of the other. (The term PMS, without an argument, refers to the set of all resources that can affect the mapping for any source. However, it should be noted that different sources may have different mappings—e.g., in a real-world application, different processes may have different page tables. Thus, PMS(s) may refer to the set of resources that can affect the mapping g(s,v,e), for a given source s. In this case, PMS=PMS($s_1$)∪ ∪PMS($s_n$), where $s_1, \ldots, s_n$ is the set of all sources S.)

It may be possible to deduce the information contained in PMS by issuing access requests that identify a resource by a member of V, and then analyzing which resources these access requests lead to. In other words, even if PMS could not be accessed directly, it may be inherently readable by means of reverse engineering the address translation maps that PMS represents. Thus, it is advantageous for PMS not to include any resources in NA(P,s), since allowing PMS to include such resources would effectively allow the source, s, to read resources in NA(P,s) that s is not supposed to read. The condition shown in FIG. 23 provides this advantage.

The condition shown in FIG. 23 can be modified by substituting the set NW(P,s) or NR(P,s) for NA(P,s), giving the formulas:

$$(MP(s) \cup PMS) \cap NW(P,s) = \phi$$

and $$(MP(s) \cup PMS) \cap NR(P,s) = \phi.$$

These conditions are more restrictive than the condition shown in FIG. 23, since they ensures that MP(s) and PMS do not contain any of the resources that s is not permitted to write (or read). (As explained above, NW(P,s) is a superset of NA(P,s), so the condition X∩NW(P,s)=φ limits the contents of X at least as much as X∩NA(P,s)=φ. Similarly, NR(P,s) is a (different) superset of NA(P,s).)

Figure 24:
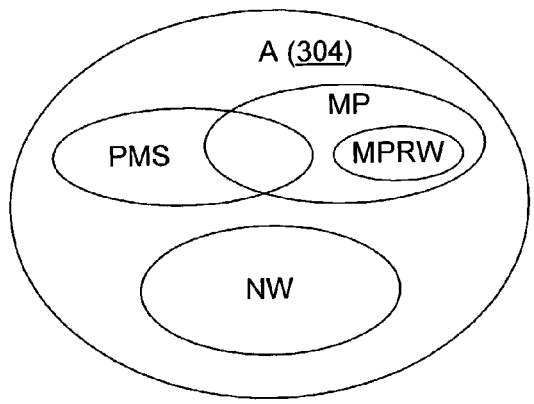
FIG. 24 is a block diagram of a fourth exemplary invariant condition.

FIG. 24 shows the invariant condition $$(MP(s) \cup PMS) \cap NW(P,s) = \phi \; \hat{} \; MPRW(s) \cap PMS = \phi.$$

In this invariant, MP(s), NW(P,s), and PMS are defined as above. MPRW(s) is a subset of MP(s). In particular, in an embodiment of the invention in which the function g produces an attribute together with a member of A, MPRW(s) is the subset of MP(s) that do not carry the read-only attribute. (MPRW stands for "mapped-pages, read/write," indicating that MPRW contains those pages that are read/write as opposed to read-only. It will be understood that, while the label MPRW refers to the term "pages," MPRW is not limited to systems that employ paging, but rather works with any system that conforms to the model of FIG. 3.) Formally, the definition of MPRW(s) is:

MPRW (s)={a∈A: ∃v∈V such that g(s,v)=a, s is a given source, and g(s,v) does not carry the "read-only" attribute}.

In the example of a virtual memory system, MPRW(s) is the set of resources for which source s has a virtual address, but which have been marked as being only readable by s. (Again, it should be noted that to say that a resource carries the read-only attribute is different from saying that the resource is not writeable under the policy P. P is an abstract policy that expresses, among other things, which resources a given source should be allowed to write. Attributes are a feature that can be enforced by a memory management unit, such as MMU 1304, shown in FIG. 13. An MMU can reject requests to write resources that carry the read only attribute. In this sense, read-only attributes are a tool that can be used to implement the policy; however, such attributes are distinct from the policy itself. Of course, since the attribute is part of the mapping—i.e., part of the range of function g—the portion of memory in which the attribute is stored is a member of PMS. In a typical implementation of virtual memory, the attributes are stored in the page table entry that points to a given page, and the page table itself would be a member of PMS.)

Figure 25:
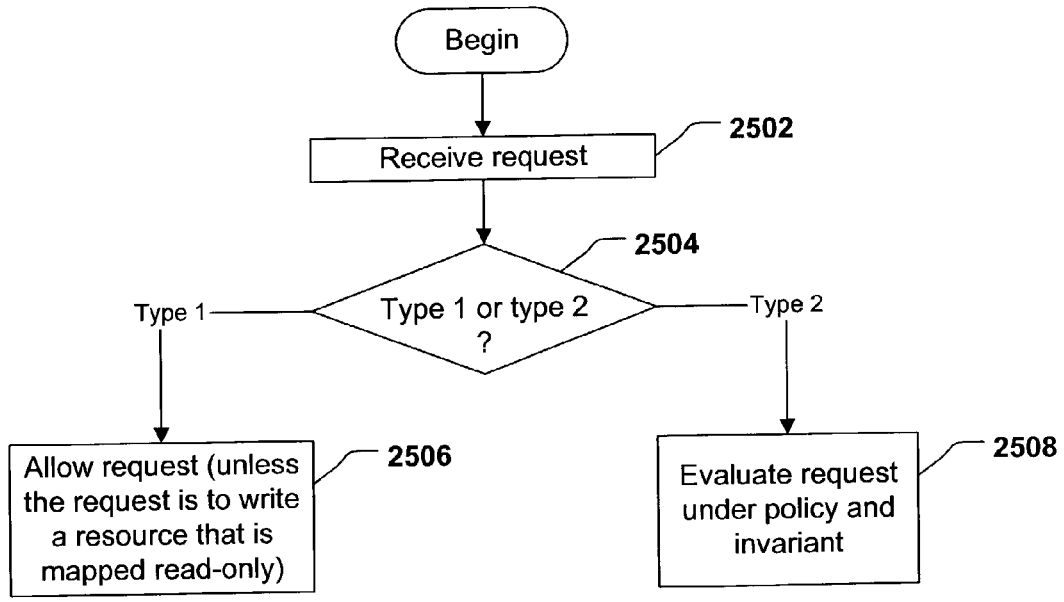
FIG. 25 is a flow diagram of an exemplary process for evaluating an access requests where the condition of FIG. 24 exists.

The invariant condition shown in FIG. 24 is advantageous, because it maintains a state in which type 1 write requests can be allowed without further evaluation. Since the condition ensures any resource that s could address with a virtual address would carry the read-only attribute, a guard can allow any type 1 write request; if the address translation process generates a read-only attribute, then the address translation mechanism itself (e.g., a conventional MMU) can block the request. Thus, when the invariant condition shown in FIG. 24 is maintained, access requests can be processed according to the process 2500 shown in FIG. 25. When an access request is received (step 2502), a determination is made as to whether the request is of type 1 or type 2, as defined above (step 2504). If the request is of type 2, then a guard evaluates the request under the relevant policy and invariant condition (step 2508). If the request is of type 1, then the request is allowed to proceed, unless the request is a write request on a resource for which the virtual address mapping function produces the read-only attribute. (It will be recalled that attributes are a feature that can be enforced by a conventional MMU. In the case of a write request on a resource that is mapped as read-only, the MMU conventionally blocks the request and generates an access fault. In accordance with the invention, a system can be configured to invoke the guard when such a fault is received, and the guard may actually allow the request to proceed depending upon whether the request is consistent with the policy and invariant preserving.)

It should be understood that the various primitives used in the invariants described above—e.g., MP, PMS, NA, NW, NR—can be used in various combinations, depending upon how much security is desired, and/or what types of optimizations one desires to flow from the invariant conditions. It should be emphasized that the invention is not limited to any of the invariants shown above, but rather applies to any system that somehow constrains MP and/or PMS based on the applicable policy.

Exemplary Implementation Techniques

As described above, the invention can be implemented in any system that preserves an invariant condition over resource-access transactions. The following techniques may be used to implement such a system.

First, it may be useful to mark those portions of an addressable entity in which PMS is contained as read-only. By doing so, a source will be permitted to read (and use) the PMS data to map set V into set A (e.g., to convert virtual addresses to physical addresses), but any attempt to write the PMS will cause the MMU to generate an exception, which can be handled by invoking a guard. The guard can then evaluate the attempted write access to determine whether it will (a) violate the policy, or (b) violate the invariant. As long as neither the policy nor invariant will be violated, the guard can then permit the write access to occur, even though the PMS resources have been marked as read-only. (Since PMS is still read-only for the source that initiated the access request, the guard may actually perform the write on behalf of the requesting source. In this case, the V→A map (i.e., the function g) may be arranged such that PMS resource map as read/write when requested by the guard, but read-only when requested by other sources.) In a sense, this technique uses an MMU's existing capability to enforce the read-only attribute as a type of sub-guard in a selective filtering process: this "sub-guard" allows all read requests, and also allows write requests on resources that are marked read/write, while write requests on read-only resources are passed to another sub-guard for further evaluation.

Second, as an alternative, it may be useful to mark the PMS portions of the addressable entity as not present. In this case, any read or write request on the PMS resources will generate a fault. The system in which the invention is deployed can be configured to invoke the guard whenever such a fault occurs. The guard can then evaluate write requests as described above. Additionally, since read requests will also generate a fault, additional processing can be done at the time of a read request as well. This opportunity to invoke some type of processing in response to every request to access PMS supports batch updates to the contents of PMS—or even "lazy" updates. In this case, writes to PMS can be queued rather than executed immediately, and the queued writes can be batch executed, or selectively executed on an as-needed basis, at the time a read request is received. Again, using the present/not-present marker in this manner effectively uses the MMU as a type of sub-guard in a selective filtering process.

Third, it may be desirable to alter the criteria that the evaluator uses to allow or disallow write requests that could change MP and/or affect the contents of PMS. In the above examples, various invariant conditions were defined, and it was assumed that the guard would allow or disallow a request that satisfies the policy strictly depending on whether carrying out the request would preserve or violate the invariant. However, the system need not be implemented in this manner. For example, if INV is the relevant invariant, the guard could be conditioned to allow or deny the request based on the following condition:

$$\text{INV} \lor X,$$

where X is some condition different from the invariant. While this formula might appear to allow access requests that would violate the invariant (since such requests could be allowed as long as X is true, even if they will produce a state where INV is false), the system could also be configured to ensure that X is never true, or is only true in circumstances where INV would also be true, etc. Since this technique ultimately ensures that any allowable transaction will preserve INV as true, it is actually just a particular way of ensuring that INV is preserved.

Fourth, it may be possible to configure the guard not merely to allow or disallow access requests, but to change or augment the access request in some manner that enforces the policy and preserves INV. For example, if a source s requests to write PMS in a manner that would cause MP(s) to include resources in NA(P,s), the guard can allow the write request but, at the same time, change the policy so that that NA(P,s) no longer includes the resource that has been added to MP(s), and may also flush any data that was previously stored in that resource. As another example, where PMS comprises a set of page table entries, if a source attempts to write into one of these entries a pointer to a page in NA(P,s), the guard can modify the request so as to set the not present bit in the entry, so that the MMU that implements address translation mechanism 310 ultimately will not dereference the pointer written. This transaction is invariant preserving, since pointers in a page table that have been marked "not present" will not be dereferenced by the MMU, so the resources pointed to by such pointers are effectively not in MP. As another example, if a source attempts to write an entry into PMS that would create a read/write mapping to a page in PMS (e.g., by listing a PMS page with the read/write attribute), the guard can modify the request by writing the entry with the read-only attribute instead of the read/write attribute. These examples demonstrate that the invention does not require that a requests be allowed or denied exactly as presented, but can be modified in some manner to satisfy both the policy and the invariant.

Controlling Access of Resources to Protect the Guard

As can be appreciated from the foregoing discussion, certain aspects of the invention assume that a guard exists to ensure that access requests comply with the policy, P, and the relevant invariant condition. It is thus apparent that the ability to enforce the policy is only as effective as the guard, and, thus, if the guard can be sabotaged, the policy can be violated. One way to protect the guard from such sabotage is to store any information that can affect the functioning of the guard in access-restricted resources.

In order to protect the guard in this manner, all information necessary to represent a guard (e.g. executable code, state information, etc.) is stored in addressable entity 310. The term CORE denotes the subset of A, such that the correct functioning of the guard depends on f(a) for a∈CORE. The guard must prevent any untrusted source from writing to CORE.

In order to implement this requirement, a policy P''' is defined, which is at least as restrictive as P, but imposes the addition restriction that $CORE \subseteq NW(P''',s)$, for all sources s except for those sources that are trusted to affect the guard state. (Such source might include a system administration process, or a trusted component of the operating system.) The access-control techniques that have been previously described can then be employed on the policy P''' instead of P. This will have the effect of enforcing the policy P (since P''' is at least as restrictive as P), and also protecting the guard from sabotage.

It is noted that the foregoing examples have been provided merely for the purpose of explanation and are in no way to be construed as limiting of the present invention. While the invention has been described with reference to various embodiments, it is understood that the words which have been used herein are words of description and illustration, rather than words of limitations. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

What is claimed is:

1. A method of controlling access to one or more resources in accordance with a policy, the method comprising:
    defining an invariant condition constraining one or more resources that can be identified using a virtual address, the invariant condition being defined such that a set of physical addresses that a source can address through an address translation mechanism using a virtual address and a set of resources to which access by the source is unallowable by the policy are distinct and non-intersecting;
    receiving a request to allow a requesting source to access one of the resources;
    determining whether the request identifies a resource using a virtual address or using a physical address;
    if the request identifies the resource using a virtual address, then allowing the request without evaluating whether the request violates the policy;
    if the request identifies the resource using a physical address, then determining whether the physical address is a member of a set of physical addresses to which the policy blocks access;
    if the physical address is a member of the set of physical addresses to which the policy blocks access, then blocking the request; and
    if the physical address is not a member of the set of physical addresses to which the policy blocks access, then allowing the request.

2. The method of claim 1, further comprising:
    initializing the resources to a state in which none of the resources to which access is unallowable under the policy has a virtual address usable by the source.

3. The method of claim 1, wherein the resources comprise individually-addressable units of a random access memory.

4. The method of claim 1, wherein information that affects which of the resources corresponds to a given virtual address is stored in a set of the resources, the method further comprising denying the request if execution of the request would result in access to any of the resources in the set that is disallowed under the policy.

5. The method of claim 1, wherein information that affects which of the resources corresponds to a given virtual address is stored in a set of the resources, wherein each virtual address is associated with an attribute indicating whether a resource associated with the virtual address is not writeable, the method further comprising denying the request if execution of the request would result in the set including any resource having virtual addresses whose attributes are indicative of being writeable by the source.

6. The method of claim 5, further comprising denying the request if execution of the request would result in access to any of the resources in the set that is disallowed under the policy.

7. The method of claim 6, further comprising denying the request if execution of the request would result in a circumstance where the source can use a virtual address to address a resource that the source is not allowed to write under the policy, or if execution of the request would result in a circumstance where the set includes any resources that the source is not allowed to write under the policy.

8. The method of claim 1, wherein execution of the request will cause one or more of the resources to acquire virtual addresses, and wherein the method further comprises determining that the policy allows access to each of the resources that will acquire a virtual address as a result of executing the request.

9. The method of claim 1, wherein execution of the request will result in a change to the policy, and wherein the method further comprises determining that the policy, as affected by the change, allows the source to access all of the resources that the source can address using virtual addresses.

10. The method of claim 9, wherein the change to the policy comprises allowing access to at least a first of the resources to which access had been disallowed, and wherein the method further comprises obscuring a value that had been stored in said first resource prior to the change to the policy.

11. The method of claim 9, wherein the change in the policy comprises granting unrestricted access to all resources.

12. The method of claim 1, wherein the request comprises a request to write said one of the resources, and wherein the method further comprises:
  waiting a duration of time before said one of the resources is written in accordance with the request.

13. The method of claim 12, further comprising:
  subsequent to receiving the write request, receiving a request to read said one of the resources; and
  processing the read request by:
    if the write request is allowed, then executing the write request that is the object of said waiting act and retrieving a stored value from the resource; and
    if the write request is not allowed, then outputting the value that was the subject of the write request.

14. The method of claim 1, further comprising:
  if the request is allowable under the policy and if a condition is true, then allowing the request; and
  ensuring that the condition is never true unless execution of the request will not result in a circumstance under which the source can use a virtual address to address a resource to which access is unallowable under the policy.

15. The method of claim 1, wherein execution of the request will result in a first change to the policy and will also result in a second change affecting which resources have virtual addresses, and wherein the method further comprises determining that execution of the request will not result in an intersection between the resources to which the policy, as affected by the first change, disallows access and the resources, as affected by the second change, that have virtual addresses.

16. A computer-readable storage medium encoded with computer-executable instructions to perform a method of controlling access to one or more resources in accordance with a policy, the method comprising:
  defining an invariant condition constraining one or more resources that can be identified using a virtual address, the invariant condition being defined such that a set of physical addresses that a source can address through an address translation mechanism using a virtual address and a set of resources to which access by the source is unallowable by the policy are distinct and non-intersecting and such that any request that is unallowable under the policy is deemed deniable under the invariant condition, and at least one request that is allowable under the policy is also deemed deniable under the invariant condition;
  receiving a write request to allow a requesting source to write a value to one of the resources;
  determining whether the write request identifies a resource using a virtual address or using a physical address;
  if the write request identifies the resource using a virtual address, then allowing the write request without evaluating whether the request violates the policy;
  if the request identifies the resource using a physical address, then determining whether the physical address is a member of a set of physical addresses to which the policy forbids writing;
  if the physical address is a member of the set of physical addresses to which the policy forbids writing, then denying the write request;
  if the physical address is not a member of the set of physical addresses to which the policy forbids writing, then allowing the write request
  exposing the virtual address to the source only if the request is allowable under the invariant condition, thereby preventing access by the source to the resource if execution of the write request would result in a circumstance under which the source can use a virtual address to address a resource to which access is unallowable under the policy;
  if the write request is not denied, then storing the value in the one of the resources;
  receiving a subsequent read request to read the one of the resources;
  if the write request is not denied, processing the subsequent read request by retrieving the stored value from the one of the resources; and
  if the write request is denied, processing the subsequent read request by outputting the value that was the subject of the write request.

17. The computer-readable storage medium of claim 16, the method further comprising:
  initializing the resources to a state in which none of the resources to which access is unallowable under the policy has a virtual address usable by the source.

18. The computer-readable storage medium of claim 16, wherein the resources comprise individually-addressable units of a random access memory.

19. The computer-readable storage medium of claim 16, wherein information that affects which of the resources corresponds to a given virtual address is stored in a set of the resources, and wherein the method further comprises denying the request if execution of the request would result in access to any of the resources in the set that is disallowed under the policy.

20. The computer-readable storage medium of claim 16, wherein information that affects which of the resources corresponds to a given virtual address is stored in a set of the resources, wherein each virtual address is associated with an attribute indicating whether a resource associated with the virtual address is not writeable, and wherein the method further comprises denying the request if execution of the request would result in the set including any resource having virtual addresses whose attributes are indicative of being writeable by the source.

21. The computer-readable storage medium of claim 20, wherein the method further comprises denying the request if execution of the request would result access to any of the resources in the set that is disallowed under the policy.

22. The computer-readable storage medium of claim 21, wherein the method further comprises denying the request if execution of the request would result in a circumstance where the source can use a virtual address to address a resource that the source is not allowed to write under the policy, or if execution of the request would result in a circumstance where the set includes any resources that the source is not allowed to write under the policy.

23. The computer-readable storage medium of claim 16, wherein the method further comprises:
  if the request is allowable under the policy and if a condition is true, then allowing the request; and
  ensuring that the condition is never true unless execution of the request will not result in a circumstance under which the source can use a virtual address to address a resource to which access is unallowable under the policy.

24. A method of controlling access to one or more resources in accordance with a first policy, the method comprising:
  defining an invariant condition constraining one or more resources that can be identified using a virtual address, the invariant condition being defined at least as restrictively as the policy, such that a set of physical addresses that a source can address through an address translation mechanism using a virtual address and a set of resources to which access by the source is unallowable by the first policy are distinct and non-intersecting and such that any request that is unallowable under the first policy is deemed deniable under the invariant condition, and at least one request that is allowable under the first policy is also deemed deniable under the invariant condition;

receiving a request from a requesting source to access a resource;

determining whether the request identifies the resource using a virtual address or using a physical address;

determining whether the request is allowable, deniable, or neither allowable nor deniable based on the invariant condition, wherein the determining step comprises deeming the request allowable, without evaluating the request under the first policy, if the request identifies the resource using a virtual address;

if the request is deemed allowable or deniable as a result of the determining step, then allowing or denying the request according to the result of the determining step;

if the request would be allowable under the first policy but deniable under the invariant condition, then omitting the virtual address from a list of resources that the requesting source is permitted to access;

if the request identifies the resource using a physical address, then determining whether the physical address is a member of a set of physical addresses to which the first policy blocks access;

if the physical address is a member of the set of physical addresses to which the first policy blocks access, then denying the request; and if the physical address is not a member of the set of physical addresses to which the first policy blocks access, then allowing the request.

25. The method of claim 24, further comprising:

when the determining step results in a determination that the request is neither allowable nor deniable based on the invariant condition, determining whether the request is allowable or deniable based on either the first policy or a criterion different from the invariant condition.

26. The method of claim 24, further comprising:

if the request is not deemed allowable or deniable as a result of the determining step, evaluating the request under one or more criteria, each of the criteria being different from the invariant condition and being different from each other, any request that is unallowable under the first policy being deemed deniable under any of the criteria, each of the criteria being adapted to deem deniable at least one request that is allowable under the first policy; and if the request is deemed allowable or deniable under any of the criteria, then allowing or denying the request accordingly.

27. The method of claim 24, further comprising:

if the request is not deemed allowable as a result of the determining step, evaluating the request under the first policy; and allowing or blocking the request depending on whether the request is allowable or unallowable under the first policy.

28. The method of claim 24, wherein the method is performed in a system that is adapted to assign virtual addresses to at least some of the resources, wherein the invariant condition defines as unallowable all access requests that are unallowable under a second policy and also defines as unallowable all access requests that, if executed, would result in a virtual address being assigned to a resource to which access is unallowable under the second policy.

29. The method of claim 24, wherein the method is performed in a system that comprises a virtual memory manager that associates a virtual address and an attribute with each of the resources, the particular resource and attribute associated with a virtual address being based on at least one factor other than the virtual address, the attribute indicating whether the resource is a read-only or read/write resource, and wherein the invariant condition comprises whether the request is consistent with the attribute, the request being deemed allowable as a result of the determining step if the request is consistent with the attribute, the request not being deemed either allowable or deniable as a result of the determining step if the request is not consistent with the attribute.

30. A computer-readable storage medium encoded with computer-executable instructions to perform a method of controlling access to one or more resources in accordance with a first policy, the method comprising:

defining an invariant condition constraining one or more resources that can be identified using a virtual address, the invariant condition being defined at least as restrictively as the policy, such that a set of physical addresses that a source can address through an address translation mechanism using a virtual address and a set of resources to which access by the source is unallowable by the first policy are distinct and non-intersecting and such that any request that is unallowable under the first policy is deemed deniable under the invariant condition, and at least one request that is allowable under the first policy is also deemed deniable under the invariant condition;

receiving a request from a requesting source to access a resource;

determining whether the request identifies the resource using a virtual address or using a physical address;

determining whether the request is allowable, deniable, or neither allowable nor deniable based on the invariant condition, wherein the determining step comprises deeming the request allowable, without evaluating the request under the first policy, if the request identifies the resource using a virtual address;

if the request is deemed allowable or deniable as a result of the determining step, then allowing or denying the request according to the result of the determining step;

if the request would be allowable under the first policy but deniable under the invariant condition, then omitting the virtual address from a list of resources that the requesting source is permitted to access;

if the request identifies the resource using a physical address, then determining whether the physical address is a member of a set of physical addresses to which the first policy blocks access;

if the physical address is a member of the set of physical addresses to which the first policy blocks access, then denying the request; and if the physical address is not a member of the set of physical addresses to which the first policy blocks access, then allowing the request.

31. The computer-readable storage medium of claim 30, the method further comprising:

if the request is not deemed allowable or deniable as a result of the determining step, evaluating the request under one or more criteria, each of the second criteria being different from the invariant condition and being different from each other, any request that is unallowable under the first policy being deemed deniable under any of the criteria, each of the criteria being adapted to deem deniable at least one request that is allowable under the first policy; and if the request is deemed allowable or deniable under any of the criteria, then allowing or denying the request accordingly.

32. The computer-readable storage medium of claim 30, wherein the method is performed in a system that comprises a virtual memory manager that associates a virtual address and an attribute with each of the resources, the particular resource and attribute associated with a virtual address being based on at least one factor other than the virtual address, the attribute indicating whether the resource is a read-only or read/write resource, and wherein the invariant condition comprises whether the request is consistent with the attribute, the request being deemed allowable as a result of the determining step if the request is consistent with the attribute, the request not being deemed either allowable or deniable as a result of the determining step if the request is not consistent with the attribute.

* * * * *